United States Patent
Kezele et al.

(10) Patent No.: US 10,198,865 B2
(45) Date of Patent: Feb. 5, 2019

(54) HMD CALIBRATION WITH DIRECT GEOMETRIC MODELING

(71) Applicant: Seiko Epson Corporation, Tokyo (JP)

(72) Inventors: Irina Kezele, Richmond Hill (CA); Margarit Simeonov Chenchev, Vaughan (CA); Stella Yuan, Markham (CA); Simon Szeto, Richmond Hill (CA); Arash Abadpour, Kitchener (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/740,523

(22) Filed: Jun. 16, 2015

(65) Prior Publication Data

US 2016/0012643 A1    Jan. 14, 2016

Related U.S. Application Data

(60) Provisional application No. 62/023,090, filed on Jul. 10, 2014.

(51) Int. Cl.
  *G06T 19/00* (2011.01)
  *G02B 27/01* (2006.01)
  (Continued)

(52) U.S. Cl.
  CPC .......... *G06T 19/006* (2013.01); *G02B 27/017* (2013.01); *G02B 27/0172* (2013.01);
  (Continued)

(58) Field of Classification Search
  CPC ............ H04N 13/0239; H04N 13/0022; G06T 19/006
  See application file for complete search history.

(56) References Cited

U.S. PATENT DOCUMENTS 6,335,722 B1  1/2002  Tani et al.
9,317,973 B2  4/2016  Choukroun
(Continued)

FOREIGN PATENT DOCUMENTS

EP    1852821 A1   11/2007
EP    2 341 386 A1  7/2011
(Continued)

OTHER PUBLICATIONS

McGarrity, Erin, and Mihran Tuceryan. "A method for calibrating see-through head-mounted displays for AR." Augmented Reality, 1999.(IWAR'99) Proceedings. 2nd IEEE and ACM International Workshop on. IEEE, 1999.*

(Continued)

*Primary Examiner* — Gregory J Tryder
*Assistant Examiner* — Scott E Sonners
(74) *Attorney, Agent, or Firm* — Oliff PLC

(57) ABSTRACT

An optical see-through (OST) head-mounted display (HMD) uses a calibration matrix having a fixed sub-set of adjustable parameters within all its parameters. Initial values for the calibration matrix are based on a model head. A predefined set of incremental adjustment values is provided for each adjustable parameter. During calibration, the calibration matrix is cycled through its predefined incremental parameter changes, and a virtual object is projected for each incremental change. The resultant projected virtual object is aligned to a reference real object, and the projected virtual object having the best alignment is identified. The setting values of the calibration matrix that resulted in the best aligned virtual object are deemed the final calibration matrix to be used with the OST HMD.

16 Claims, 23 Drawing Sheets

(51) Int. Cl.
| | | |
|---|---|---|
| H04N 13/00 | (2018.01) | |
| H04N 13/02 | (2006.01) | |
| H04N 13/04 | (2006.01) | |

(52) U.S. Cl.
CPC ....... *H04N 13/004* (2013.01); *H04N 13/0275* (2013.01); *H04N 13/044* (2013.01); *G02B 2027/0178* (2013.01)

(56) References Cited

U.S. PATENT DOCUMENTS

| | | | |
|---|---|---|---|
| 2002/0052709 | A1 | 5/2002 | Akatsuka et al. |
| 2002/0105484 | A1 | 8/2002 | Navab et al. |
| 2002/0113756 | A1* | 8/2002 | Tuceryan ............. G02B 27/017 345/8 |
| 2002/0180759 | A1 | 12/2002 | Park et al. |
| 2003/0080978 | A1 | 5/2003 | Navab et al. |
| 2008/0292131 | A1 | 11/2008 | Takemoto et al. |
| 2008/0317333 | A1 | 12/2008 | Li et al. |
| 2010/0182426 | A1 | 7/2010 | Perruchot et al. |
| 2011/0194029 | A1* | 8/2011 | Herrmann ............ G02B 27/017 348/569 |
| 2011/0248904 | A1* | 10/2011 | Miyawaki ............ G02B 27/017 345/7 |
| 2012/0062691 | A1 | 3/2012 | Fowler et al. |
| 2012/0212398 | A1 | 8/2012 | Border et al. |
| 2012/0257024 | A1 | 10/2012 | Inaba |
| 2012/0313955 | A1 | 12/2012 | Choukroun |
| 2013/0050065 | A1 | 2/2013 | Shimizu |
| 2013/0050833 | A1 | 2/2013 | Lewis et al. |
| 2013/0106694 | A1 | 5/2013 | Tanaka et al. |
| 2013/0162675 | A1 | 6/2013 | Matsushima et al. |
| 2013/0187943 | A1 | 7/2013 | Bohn et al. |
| 2013/0230209 | A1 | 9/2013 | Hashimoto et al. |
| 2013/0235169 | A1 | 9/2013 | Kato et al. |
| 2013/0241805 | A1 | 9/2013 | Gomez |
| 2014/0071308 | A1 | 3/2014 | Cieplinski et al. |
| 2014/0160320 | A1 | 6/2014 | Babale et al. |
| 2014/0327792 | A1 | 11/2014 | Mulloni et al. |
| 2014/0333665 | A1* | 11/2014 | Sylvan ............... G02B 27/0149 345/633 |
| 2015/0009313 | A1 | 1/2015 | Noda et al. |
| 2015/0025683 | A1 | 1/2015 | Amano |
| 2015/0109335 | A1 | 4/2015 | Hayakawa et al. |
| 2015/0169085 | A1 | 6/2015 | Ida et al. |
| 2015/0213648 | A1* | 7/2015 | Wu ................... H04N 13/0022 345/419 |
| 2015/0220143 | A1 | 8/2015 | Choi et al. |
| 2015/0228122 | A1 | 8/2015 | Sadasue |
| 2015/0293362 | A1 | 10/2015 | Takahashi et al. |
| 2016/0139413 | A1 | 5/2016 | Gribetz et al. |
| 2016/0203581 | A1 | 7/2016 | Keller et al. |
| 2016/0247322 | A1 | 8/2016 | Komaki |
| 2016/0262608 | A1 | 9/2016 | Krueger |
| 2016/0269685 | A1 | 9/2016 | Jessop et al. |
| 2016/0295208 | A1 | 10/2016 | Beall |
| 2016/0323569 | A1 | 11/2016 | Wang |
| 2016/0349510 | A1 | 12/2016 | Miller et al. |
| 2017/0041592 | A1 | 2/2017 | Hwang et al. |
| 2017/0054970 | A1 | 2/2017 | Singh et al. |
| 2017/0085770 | A1 | 3/2017 | Cui et al. |
| 2017/0213085 | A1 | 7/2017 | Fu et al. |
| 2017/0278262 | A1 | 9/2017 | Kawamoto et al. |
| 2018/0007350 | A1 | 1/2018 | Liu et al. |

FOREIGN PATENT DOCUMENTS

| | | |
|---|---|---|
| JP | H06-137840 A | 5/1994 |
| WO | 2004/113991 A2 | 12/2004 |

OTHER PUBLICATIONS

Genc, Yakup, Mihran Tuceryan, and Nassir Navab. "Practical solutions for calibration of optical see-through devices." Proceedings of the 1st International Symposium on Mixed and Augmented Reality. IEEE Computer Society, 2002. (Year: 2002).*

Owen, Charles B., et al. "Display-relative calibration for optical see-through head-mounted displays." Mixed and Augmented Reality, 2004. ISMAR 2004. Third IEEE and ACM International Symposium on. IEEE, 2004. (Year: 2004).*

Billinghurst, M., et al., "Collaborative Mixed Reality", Proceedings of International Symposium on Mix Reality, Jan. 1, 1993, pp. 261-284.

Owen, Charles B., et al., "Display-Relative Calibration for Optical See-Through Head-Mounted Displays", Proceedings of the Third IEEE and ACM International Symposium on Mixed and Augmented Reality, Nov. 2-5, 2004, Arlington VA, USA, IEEE Piscataway, NJ, USA, pp. 70-78.

Genc, Yakup, et al., "Practical Solutions for Calibration of Optical See-Through Devices", Proceedings of International Symposium on Mixed and Augmented Reality, ISMAR 2002, Sep. 30-Oct. 1, 2002, Darmstadt, Germany, IEEE Computer Society, Los Alamitos, pp. 169-275.

McGarrity, E., et al., "A Method for Calibrating See-through Head-mounted Displays for AR", Proceedings of the IEEE 2nd International Workshop on Augmented Reality (IWAR 99), San Francisco, CA, Oct. 20-21, 1999.

Gottschalk, S., et al., "Autocalibration for Virtual Environments Tracking Hardware", Proceedings of SIGGRAPH 93, Computer Graphics Proceedings, Annual Conference Series, pp. 65-72, 1993.

Malek, S., et al., "Calibration Method for an Augmented Reality System", World Academy of Science, Engineering and Technology 21 2008.

Tuceryan, M., et al., "Calibration Requirements and Procedures for a Monitor-Based Augmented Reality System", IEEE Transactions on Visualization and Computer Graphics, vol. 1, No. 3, pp. 255-273, Sep. 1995.

Fuhrmann, A., et al., "Fast Calibration for Augmented Reality", Proceedings of the ACM symposium on Virtual reality software and technology, Dec. 20-22, 1999.

Zhang et al.; "Visual Marker Detection and Decoding in AR Systems: A Comparative Study," Augments Reality Group; Siemens Corporation Research; Princeton, NJ; 2002; pp. 1-10.

You et al.; "Hybrid Inertial and Vision Tracking for Augmented Reality Registration," XP-010329315.

Naimark Leonid et al. "Circular Data Matrix Fiducial System and Robust Image Processing for a Wearable Vision-Inertial Self-Tracker". Proceedings of the International Symposium on Mixed and Augmented Reality (ISMAR'02), pp. 1-10, Dec. 2002.

Feb. 14, 2018 Office Action issued in U.S. Appl. No. 15/346,112.
Feb. 14, 2018 Office Action issued in U.S. Appl. No. 15/346,261.
Feb. 27, 2018 Office Action issued in U.S. Appl. No. 15/159,327.

Kato, Hirokazu et al., "Marker Tracking and HMD Calibration for a Video-based Augmented Reality Conferencing System," Augmented Reality, (Oct. 1999), Proceedings of the Second IEEE and ACM International Workshop in San Francisco, California, pp. 85-94.

U.S. Appl. No. 15/346,112, filed Nov. 8, 2016 in the name of Li et al.

U.S. Appl. No. 15/346,261, filed Nov. 8, 2016 in the name of Fu et al.

Aug. 10, 2018 Office Action issued in U.S. Appl. No. 15/346,112.
Aug. 13, 2018 Office Action issued in U.S. Appl. No. 15/346,261.

\* cited by examiner

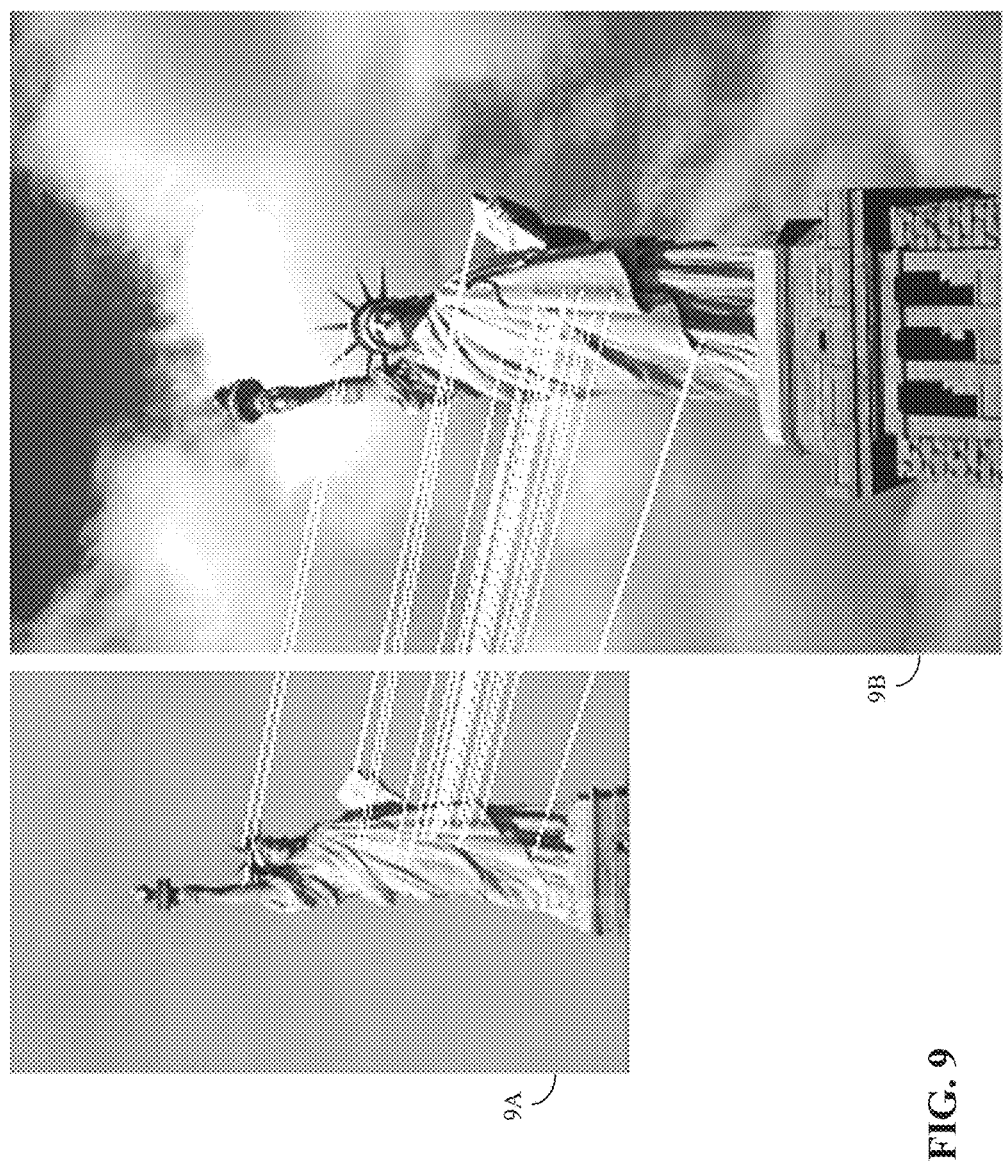

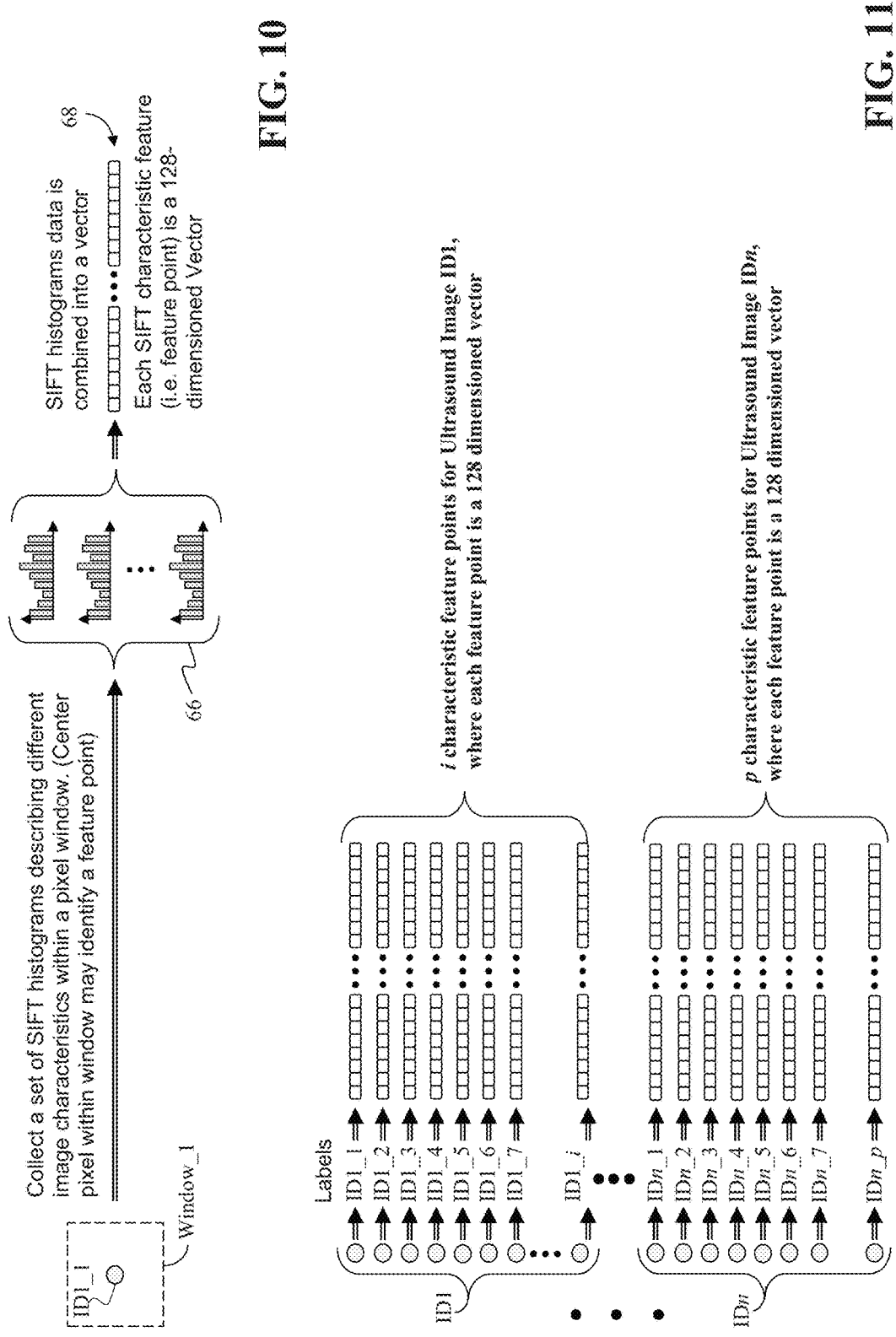

Small Rotation Approximation

Approximating small rotations with translations in 3D (rotation axis = $\vec{r_1}$, rotation angle $\theta$, approximative translation vector = $\overrightarrow{\Delta l}$).

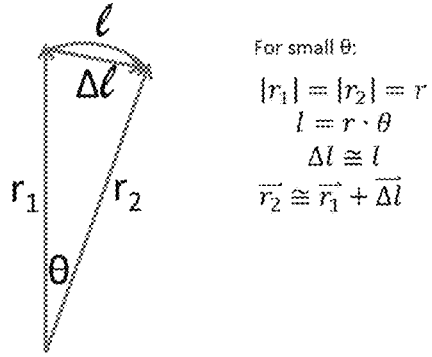

For small $\theta$:
$$|r_1| = |r_2| = r$$
$$l = r \cdot \theta$$
$$\Delta l \cong l$$
$$\vec{r_2} \cong \vec{r_1} + \overrightarrow{\Delta l}$$

FIG. 21

Eye Coordinate System

Depiction of the natural eye-coordinate system in relation to the HMD screen.

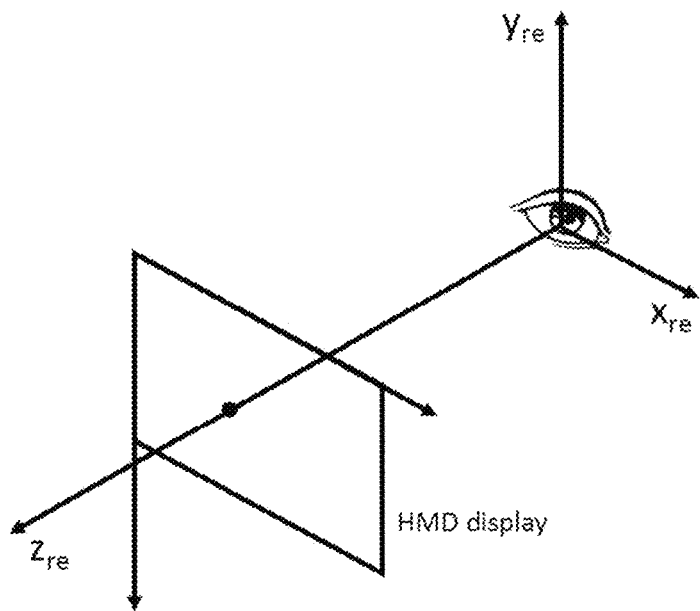

FIG. 23

Calibration Coordinate System

Transformation from the world (marker-real reference object) to the virtual camera coordinate system.

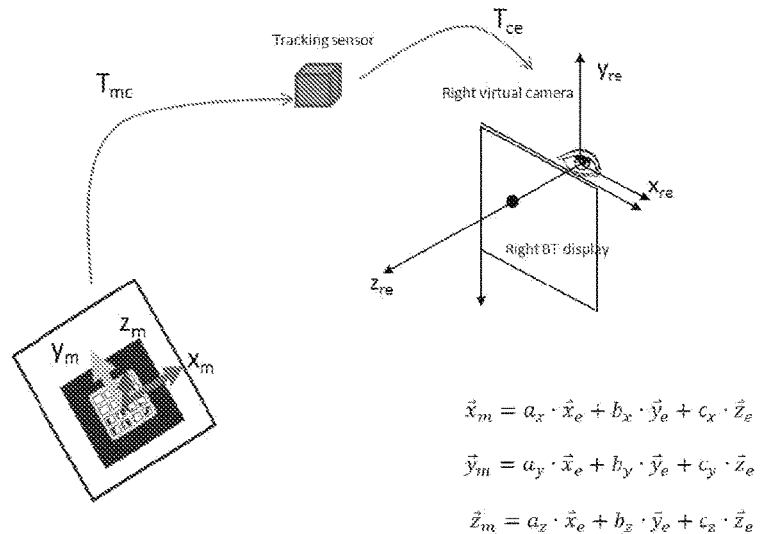

$$\vec{x}_m = a_x \cdot \vec{x}_e + b_x \cdot \vec{y}_e + c_x \cdot \vec{z}_e$$

$$\vec{y}_m = a_y \cdot \vec{x}_e + b_y \cdot \vec{y}_e + c_y \cdot \vec{z}_e$$

$$\vec{z}_m = a_z \cdot \vec{x}_e + b_z \cdot \vec{y}_e + c_z \cdot \vec{z}_e$$

$$T_{me} = T_{ce} \otimes T_{mc}$$

Coefficients $a_{x,y,z}$, $b_{x,y,z}$ and $c_{x,y,z}$ are functions of the composite transformation $T_{mc}$ that brings the marker coordinate system in alignment with the virtual camera coordinate system (one transformation per eye)

FIG. 24

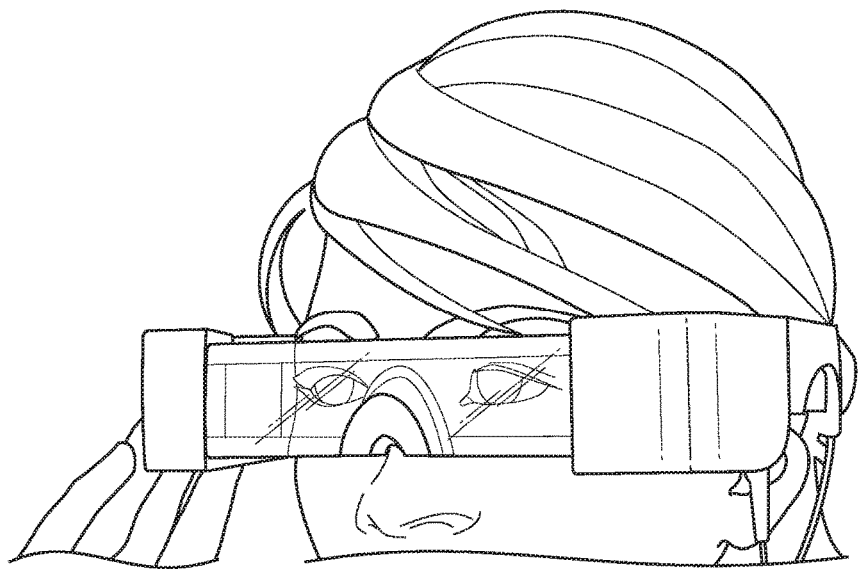

FIG. 25

HMD Calibration

The user calibrates the HMD in the coordinate system of choice (default: marker coordinate system):

The calibration object (transparent grid) is initially offset along all three coordinate axes, and the object size is not adapted to the marker size.

Note that the marker-related coordinate frame is attached to the calibration grid for easier navigation.

FIG. 26A

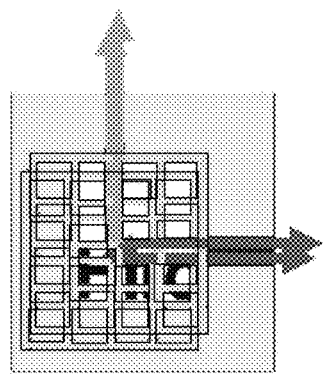
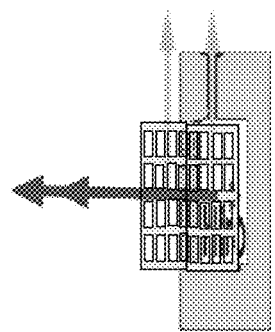
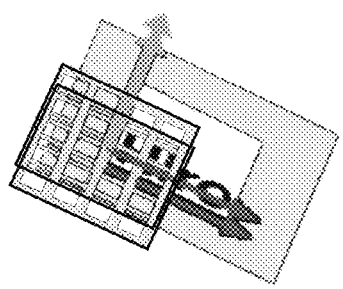
Additionally, the inter-pupillary distance might not be correct.
FIG. 26 B The first step is to adapt the user's inter-pupillary distance:

The first step is to adapt the user's inter-pupillary distance:

The third step is to adapt the object size by adjusting the focal length:

The fourth (final) step is to adjust the object's z-distance from the marker:

Motions along x and y: $\Delta T_{x(y)} = \dfrac{\tfrac{-f}{z}\cdot \Delta X(Y)}{1-\tfrac{f}{z}}$ (1)

Motion along z: $\Delta T_{xL,R} = \dfrac{\pm \Delta Z}{Z}\cdot IPD/2$ (2)

$\Delta C_{0x} = -round(s_{x(y)}\cdot \Delta T_{x(y)})$ (3)

FIG. 31

$wp = w\begin{matrix}u\\v\\1\end{matrix} = PX = P\begin{matrix}X\\Y\\Z\\1\end{matrix}$ (4)

HMD CALIBRATION WITH DIRECT GEOMETRIC MODELING

CROSS-REFERENCE TO RELATED APPLICATION(S)

This application claims the benefit under 35 U.S.C. 119(e) of Provisional Patent Application No. 62/023,090, filed on Jul. 10, 2014, which is hereby incorporated by reference in its entirety.

BACKGROUND

Field of Invention

Broadly, the present invention relates to the field of camera calibration, and more specifically to the field of virtual camera calibration, where the latter consists of the human-eye/optical see-through (OST) head-mounted display (HMD) system, as a part of an augmented reality (AR) unit. More particularly, the present invention relates to calibration of the virtual views of OST HMDs. Specifically, the present invention relates to stereo calibration of the latter, and anchoring perceived virtual 3D objects to a real 3D environment.

Description of Related Art

Head-mounted displays have become increasingly popular for 3D visualization, particularly for replacing real environments with virtual substitutes. In parallel, the field of augmented reality (AR) has likewise been growing. In an AR system, real environments are enriched by superposition of virtual items, which may include virtual objects or text that appears to float by a real object to which it refers. Thus, there are two main aspects of AR technology: the capacity to enhance visual content and the potential to extend and enhance a user's interaction with the real world.

An AR unit may provide a view (or display or image) of visual content as "seen" (or captured) by a virtual camera. As it is known in the art, a virtual camera displays an image of a virtual object from a prescribed angle (or field of view, FOV) as it would be captured, or seen, by a real camera if a real camera were positioned at the prescribed angle and the virtual object were a real object. The resultant view includes not only the real, physical items in a real scene, but also virtual objects inserted into the real scene. In such an augmented reality (AR) unit, the virtual camera view may be provided by an optical see-through (OST) head-mounted display (HMD) system (i.e., an OST HMD system).

In a human-eye/optical see-through display, an individual image is designated for, and observable by, a select eye(s) of a human user. If the human-eye OST is a monoscopic display then only one image for one (or both) of a user's two eyes is provided. If the human eye OST is a stereoscopic display then two separate images, one for each of the user's two eyes, are provided. For example, a human eye OST may have one display directly over one eye of a human user, and optionally have another, separate display directly over the other eye of the human user. Alternatively, a human eye OST may project a separate image directly into separate eyes of the human user, or otherwise control separate images to be separately viewed by each of the one or two eyes of the human user.

Typically, this includes establishing a method of consistently translating between real-world coordinates of a real-world scene and virtual coordinates in a computer generated virtual scene corresponding to the real-word scene. In order for an AR system to provide an immersive experience, it is desirable that the virtual objects be rendered and placed within the virtual camera display in three dimensions (3D), i.e. a stereoscopic image, or display. This, in turn, requires capturing 3D information of the real-world scene. Such 3D information may be obtained by such means as "time-of-flight" sensors, visual tracking, inertial sensors, mechanically linked trackers, phase-difference sensors, and/or hybrid systems. Irrespective of the 3D capturing method used, an AR system requires calibration between the captured real-world information and the computer-generated, virtual world information. This requires calibrating the AR's virtual camera view to the real-world captured data.

There are many methods of calibrating a virtual camera to real-world captured information, but such methods are often time-consuming and/or have high computing resource requirements. It is desirable that an AR system be portable and wearable by a human user, which places limits on computer architecture, and thus limits on available computing resources. It is further desirable that an AR system provide a virtual camera display in real-time, which is hindered by the limitations on available computing resources.

What is needed is a system to simplify the calibrating of real-world captured data of real-world scenes/objects and a computer-generated virtual scene/object.

It is an object of the present invention to provide a system/method for simplifying the calibration of an AR system to a real-world scene.

It is a further object of the present invention to provide an AR system capable of rendering virtual camera displays combining real-world captured information with virtual object information in real-time.

SUMMARY OF INVENTION

The above objects are met in a system/method for stereo calibration of a (virtual) optical see-through (OST) head-mounted display (HMD) having left and right eye views to provide stereo images (i.e. a stereoscopic display). Defining the left and right views include modeling left and right calibration matrices (with intrinsic and extrinsic parameters modeled separately in separate calibration matrices) that define 3D-to-2D point correspondences between 3D coordinates of a real, reference object in a defined world coordinate system, and the 2D position of a corresponding virtual object in the left and right projected images of the OST HMD. The 3D pose of the virtual object that results from stereoscopic projection of the left and right 2D images that comprise the 3D virtual object is assumed known in the world coordinate system (due to prior 3D anchoring of the virtual object to its corresponding 3D reference object). The 3D pose of the (real) reference object in the coordinate system of the head-tracking device is likewise assumed known. The 3D pose of the real reference object may have been previously determined as part of an initial calibration procedure, and/or may be estimated through processing data recorded by one or more tracking devices that may be mounted on the HMD and/or attached onto the real reference object and/or distributed throughout the scene in which the real reference object is located. Geometric information including pose information (e.g. translation and rotation) provided by the tracking device(s) with respect to the left and right eye of an average head model (i.e. HMD user) is directly incorporated into the extrinsic calibration matrix for each eye. The intrinsic parameters are defined by taking into account information on the position of the average head model's eyes with respect to the two HMD displays (i.e. the left and right stereo displays), the distance of the virtual image planes from the average head model's two eyes, the size and resolution of projected left and right images (image skew is assumed negligible). In this way, the default calibration matrices for the left and right eye are delivered.

In a customization process, an individual user is offered the opportunity to adjust the calibration parameters to a personally desired accuracy. For applications of standard levels of accuracy, the customization process may consist of adjusting the user's interpupillary distance, and calibrating the focal length. As part of calibrating the focal length, the user may adjust the perceived size, position and/or rotation of the projected virtual object in a marker coordinate system made visible to the user during this customization process. It is to be understood that the marker coordinate system may be made invisible when not executing the customization process. After calibrating the focal length, the calibration of the interpupillary distance can be directly related to the virtual object depth calibration and can thus be performed implicitly as a part of the virtual object position calibration. The results of the customization process are used to update the relevant intrinsic and extrinsic default calibration matrices. These matrices are consequently used to anchor the 3D virtual to the 3D real, reference object. The calibration procedure is fast, simple, and user-friendly.

The above-described calibration system/method may be applied to an OST HMD equipped with a mounted camera for visual head-tracking. Alternatively, the calibration system/method may also be applied to any other tracking sensors with known pose in the pre-specified world coordinate system. Nonetheless, the complexity of the calibration method may vary depending on the particularities of the augmented reality system in use. The preferred embodiment is presented as part of stereo OST HMD calibration, however, it is straightforward to modify the present invention to monoscopic and 2D view OST HMD systems, which would reduce the complexity of the system and calibration procedure.

The above objects are met in a calibration method of an optical see-through (OST) head-mounted display (HMD) of an augmented reality (AR) system, comprising: providing a real target object in a scene where the OST HMD is to be used, said real target object being of known dimensions, location and orientation within said scene; defining a default calibration matrix set based on a predefined head model; generating a virtual object representation of the real target object using the default calibration matrix set, and projecting a view of the virtual object; centrally aligning the projected view of virtual object onto the real target object as much as possible; cycling through a predefined number of incremental changes in at least one predefined parameter within said default calibration matrix set; for each incremental change of the predefined parameter, generating and projecting a new virtual object, re-aligning the new virtual object to the real target object, and comparing the current re-alignment of the current new virtual object to a previous alignment of a previously projected virtual object; identifying the projected virtual object having the best alignment with the real target object and designated it a calibrated virtual object; and setting the OST HMD to use the calibration matrix set with the value of the predefined parameter that corresponds to the calibrated virtual object.

Preferably, the OST HMD is a stereo AR system providing a binocular image of the projected virtual object.

Further preferably, the binocular image is comprised of a left image and a right image; the step of re-aligning the new virtual object to the real target object is conducted separately for each of the left image and right image; and the calibrated virtual object is further defined as the projected virtual object whose left image virtual object projection and right image virtual object projection best aligned with each other.

Additionally, the default calibration matrix set includes an extrinsic parameter matrix and an intrinsic parameter matrix, both matrices being defined from direct geometric measures of the OST HMD and head model; and the extrinsic parameter matrix and intrinsic parameter matrix are based on a pin-hole camera model.

In this case, updates to the extrinsic parameter matrix are obtained from direct geometric measures of the 3D pose (3D rotation+3D translation) of a projected and aligned virtual object by using the known dimensions, location and orientation of the real target object and a coordinate system of the real target object.

Furthermore, values in the coordinate system of the real target object are converted to values in a coordinate system of the project virtual object.

Also, each projected virtual object is generated using a virtual camera.

In a preferred embodiment, the projected virtual object is based on the pin-hole camera model; parameters within the intrinsic parameter matrix are defined using the following geometric measures: a distance from a center of the virtual pin-hole camera to a center of a virtual image plane of the virtual pin-hole camera is used to define a focal length; and the center position of the virtual image plane with respect to the head model, and an image resolution of the projected image to define a center pixel position of the projected image, and pixel density of the projected virtual object.

In this case, the OST HMD is a stereo AR system providing a binocular image of the projected virtual object; the binocular image is comprised of a left image and a right image, each having a respective extrinsic parameter matrix and an intrinsic parameter matrix; and the defined focal length is used for both left image and right image.

Additionally, the one predefined parameter is an interpupillary distance (IPD), and an optimal IPD is found by: conducting the step of re-aligning the new virtual object to the real target object separately for each of the left image and right image; and identifying the parameter value that results in the re-aligned new virtual object of the left image being aligned to the re-aligned new virtual object of the right image.

It is further noted that the optimal IPD does not necessarily match a user's true IPD.

Preferably, the cycling through the predefined number of incremental changes is responsive to a user-controlled input.

It is to be understood that the recited one predefined parameter may be one of a plurality of said predefined parameters; incremental changes in said plurality of predefined parameters result in translation of the projected virtual object, and a difference in the orientation of the projected virtual object relative to the real target object is corrected by adjusting the translation of the projected virtual object.

The above objects are further met by a non-transient computer readable media embodying instructions to execute the method of the presently preferred embodiment by a computing device.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 9 is an example of feature point correspondence in two images of a common scene, taken from different field-of-views, i.e. FOVs.

FIG. 10 provides an overview of the feature point extraction function of SIFT.

FIG. 11 illustrates multiple sets of feature points extracted from n images, where the images are identified as ID1 through IDn.

FIG. 21 illustrates compensating for rotation error by correcting for the translation error.

FIG. 23 illustrates an eye coordinate system.

FIG. 24 illustrates a calibration coordinate system.

FIG. 25 illustrates a user calibrating a goggle-style HMD.

FIGS. 26A and 26B illustrate various steps in a user-calibration procedure.

FIGS. 31 and 32 provide mathematical formulas and symbols used in the preferred embodiment of the present invention.

DESCRIPTION OF THE PREFERRED EMBODIMENTS

Figure 1:
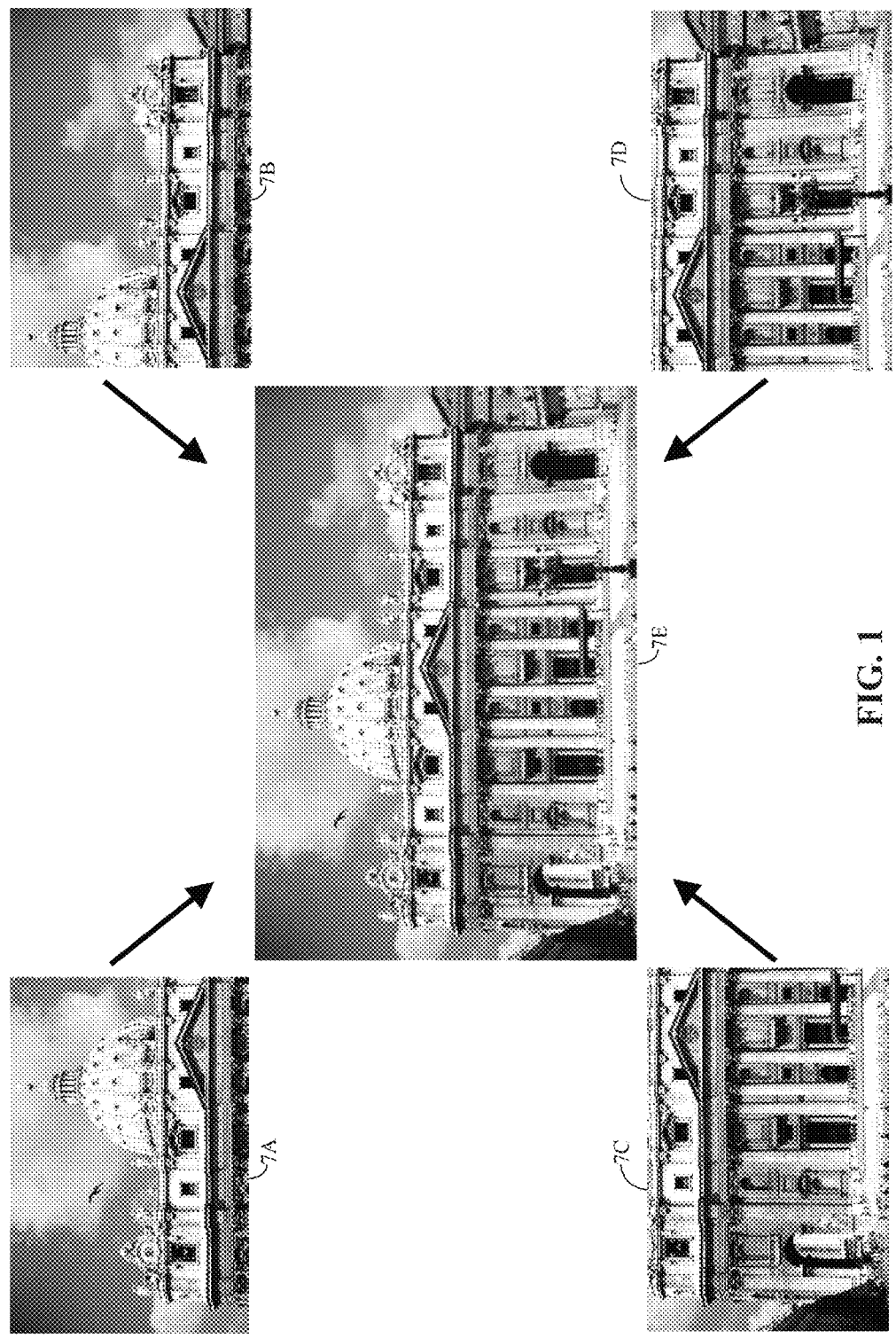
FIG. 1 illustrates the use of corresponding feature points in different images to stitch together the images to create a larger composite image.

Head-mounted displays have found wide acceptance in the field of augmented reality (AR), which augment a real-world scene with computer-generated, virtual content. A head-mounted display (HMD) in an AR system may include a human-eye/optical see-through (OST) display, which is a see-though display on which virtual objects are incorporated, or a video see-through (VST) display, which is a video display (e.g. screen) that integrates virtual objects into displayed images of a real scene. In both cases, the virtual objects are made to blend with a view of the real-world scene. Both approaches may make use of tracking sensors (e.g. 3D scene capturing devices such as "time-of-flight" sensors, visual tracking (e.g. stereo camera pairs), inertial sensors, mechanically linked trackers, phase-difference sensors, and/or hybrid systems) to track (and/or capture) real-world scene information.

In such AR systems, a computer generates graphics of virtual objects, which are subsequently aligned with their real object counterparts (i.e., corresponding physical reference objects) as imaged by the tracking sensors, ideally in real time. The goal is to assure that the virtual objects are attached, or anchored, to prescribed real world coordinates to enable the perceptual fusion of the real and virtual environments. Proper perceptual fusion necessitates gauging/calibrating the tracking sensor as well as virtual camera parameters, and knowing the position (and/or pose) of the real and virtual objects in a tracker coordinate system.

The position of real world objects in the tracker coordinate system is obtained through a tracking mechanism that can be based on different types of tracking sensors (i.e. sensors and/or trackers), as listed above. Information from the tracking sensors is combined into a composite image as provided by a virtual camera. In essence, the virtual camera defines the field-of-view that defines the view of at least the virtual object provided in the HMD. The relation between the virtual camera and the employed sensor allows for anchoring and fusing of virtual objects to the real world, and this relationship may be obtained through a calibration procedure.

The calibration procedure comprehends setting the virtual camera parameters such that the 3D virtual and real objects are brought into point-to-point correspondence. Camera parameters include both intrinsic parameters (such as the focal length, pixel densities, and coordinates of an image principal point) and extrinsic parameters (such as the position of the virtual camera with respect to a tracker coordinate system).

As aforementioned, there are two main means to present visual information in an AR system: video see-through and optical see-through. In the case of video see-through, computer generated virtual objects are superimposed onto a video stream obtained by a real camera attached to the HMD. Having access to images of real-world scenes and being able to process the related data renders the calibration of the video see-through system less prone to errors. That is, since the HMD provides a constructed image that combines captured images of the real-world scene with computer generated, virtual objects, a user is less aware of misalignments between the virtual object and the actual, real-world scene.

On the other hand, calibration of optical see-through systems poses additional challenges since the HMD preferably does not hide the true real-world view from the user. Such a system may be referred to as an eye-HMD since an optical see-through (OST) display may be placed over one (and preferably two in the case of stereo vision) eye position(s) of an HMD. Some difficulties in calibrating virtual cameras of a human eye-HMD display combination relate to alignment (especially in the case of stereo vision) and to dynamically managing signal delays. That is, a user's view of the real-world scene in an eye-HMD may be instantaneous, while generating and displaying virtual objects may not be.

The eye-HMD calibration problem has been studied for a while. Just like the calibration of a real, physical camera, the calibration of the virtual camera may be performed by solving equations that bring into correspondence the coordinates of projected, virtual 3D objects and their counterparts in 2D images (projected onto virtual OST HMD image planes). The coordinates of expected virtual 3D objects placement are assumed known from perceptual alignment (anchoring) with real 3D reference objects of known coordinates.

Calibration of a virtual camera to tracking sensors is thus a critical aspect of an AR system, which in addition to its intrinsic complexity is further complicated due to it being dependent upon a human user's perception (i.e. dependent upon how a user perceives the combined virtual and real objects). Thus, there are a number of technical challenges that need to be resolved to better commercialize AR systems. Despite a number of promising results, calibration seems to remain a user dependent procedure that heretofore has necessitated a somewhat cumbersome user-interaction. The present invention presents calibration methods that can reach desired accuracy levels while remaining user-friendly and easy to apply.

Before delving into a detailed discussion of the present invention, however, it may be beneficial to first provide some background information regarding stereo camera pairs, image transformation, 3D imaging, feature point detection, and other image processing topics.

3D images of a scene, or target objects, may be produced by means of a 3D imaging system, such as a 3D laser scanner, a MICROSOFT CORP. KINECT sensor, a range camera, or any of many different types of time-of-flight devices. A 3D image may also be generated from a stereo pair of 2D images. These methods may be used to create a point cloud, which is a collection of points in three-dimensional space that define the surface of a 3D object. It may be desirable that the points of the 3D point cloud be correlated to individual points (e.g. pixels) on a 2D image (or shape outline) of a target object. That is, it may be desirable that points (or regions) of the point cloud be correlated to corresponding points (or regions) of a 2D image, and more particularly to a segmentation of the 2D image.

As is mentioned above, a 3D image may be generated from a stereo pair of 2D images (i.e. a stereoscopic (or stereo) image pair). Each of the two 2D images in a stereoscopic image pair is produced by a respective one of two 2D imaging cameras spaced apart to provide two views (i.e. two fields-of-view, FOV, or angle views) of a common scene. By means of stereo constraints, point (or pixel) information of corresponding pixels in the two views is combined to create a perspective (i.e. 3D) view, which includes point cloud information. Thus, a point cloud generated from a stereoscopic image pair intrinsically includes a correlation between points of the point cloud and points (e.g. pixels or regions) in the two 2D images of the stereoscopic image pair.

In order to extract 3D information from a stereoscopic image pair, one first needs to identify commonly imaged items in the stereoscopic image pair. One way to do this would be to calibrate the two cameras, and to identify a known point of reference in a specific scene. A less restrictive approach would eliminate the need to calibrate the cameras to a specific scene. However, since both images of the stereoscopic image pair provide different views of the common scene, this can be a difficult task. One needs to recognize different views of common objects in two 2D image scenes, and to correlate specific parts of the common objects.

Object recognition (or object identification) is thus an integral part of computer vision, and an integral part of object recognition is pattern matching. An essential component of pattern matching in images (and particularly in 2D images) is feature detection (or feature point detection), which refers to identifying parts of an image, or individual feature points of an image (such as individual pixels), that are good candidates for investigation to determine if they might be part of a sought after object in an image.

Various techniques are known for identifying characteristic features in an image that may be used to describe an imaged scene. Characteristic features may include distinguishing shapes or sections-of-an-image or individual points (i.e. pixels) of an image. For ease of discussion, the present example is described as using feature points (which include individual pixels), with the understanding that other characteristic features (and methods of identifying characteristic features) may also be used.

As an example of how characteristic features may be used, if one has a library of identifying features that describe an object (such as obtained from a collection of training images (i.e. image samples) of the target object, or object type), then one may search an input test image for those identifying features in an effort to determine if an example of the target object is present in the input test image. In the field of computer vision, this idea has been extended to matching common features of a common scene in multiple digital images of the common scene taken from different view angles (i.e. different FOVs) to index (e.g. match or correlate) feature points (i.e. pixels) from one image to another. This permits the combined processing of the multiple digital images.

For example in FIG. 1, images 7A, 7B, 7C and 7D each provide partial, and overlapping, views of a building in a real-world scene, but none provide a full view of the entire building. However, by applying edge detection and indexing (i.e. identifying matching pairs of) feature points in the four partial images 7A, 7B, 7C and 7D that correlate to the same real feature point in the real-world scene, it is possible to stitch together the four partial images (such as by applying an image stitching tool) to create one composite image 7E of the entire building. In the example of FIG. 1, the four partial images 7A, 7B, 7C and 7D are taken from the same view angle (i.e. a single FOV), but this approach may be extended to the field of correspondence matching and applied to images taken from different FOV's.

Correspondence matching refers to the matching of objects or object features (or more typically the matching of feature points, such as individual pixels) common to two or more images. Correspondence matching tries to determine which parts of a first image correspond to (i.e. are matched to) what parts of a second image, assuming that the second image was taken after the camera that took the first image had moved, time had elapsed, and/or the pictured objects had moved. For example, the first image may be of a real-world scene taken from a first view angle, defining a first field-of-view (i.e. FOV), and the second image may be of the same real-world scene taken from a second view angle defining a second FOV. Assuming that the first and second FOVs at least partially overlap, correspondence matching refers to the matching of common features points in the overlapped portions of the first and second images.

Thus, correspondence matching is an essential problem in computer vision, especially in stereo vision, view synthesis, and 3D (or perspective) reconstruction. Assuming that a number of image features, or objects, in two images taken from two view angles have been matched, epipolar geometry may then be used to identify the positional relationship between the matched image features to achieve stereo view synthesis, or 3D reconstruction.

Epipolar geometry is basically the geometry of stereo vision. For example in FIG. 2, two cameras 11 and 13 create two 2D images 15 and 17, respectively, of a common 3D scene 10 consisting of a larger sphere 19 and a smaller sphere 21. 2D images 15 and 17 are taken from two distinct view angles 23 and 25. Epipolar geometry describes the geometric relations between points in 3D scene 10 (for example spheres 19 and 21) and their relative projections in 2D images 15 and 17. These geometric relationships lead to constraints between the image points, which are the basis for epipolar constraints, or stereo constraints.

Figure 2:
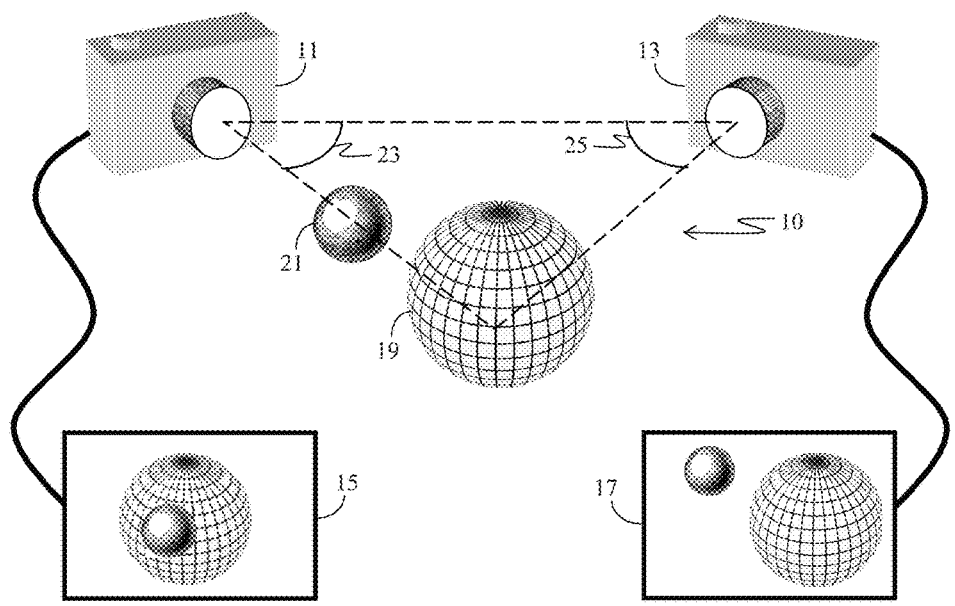
FIG. 2 illustrates the principles of Epipolar geometry.

FIG. 2 illustrates a horizontal parallax where, from the view point of camera 11, smaller sphere 21 appears to be in front of larger sphere 19 (as shown in 2D image 15), but from the view point of camera 13, smaller sphere 21 appears to be some distance to a side of larger sphere 19 (as shown in 2D image 17). Nonetheless, since both 2D images 15 and 17 are of the same 3D scene 10, both are truthful representations of the relative positions of larger sphere 19 and smaller sphere 21. The positional relationships between camera 11, camera 13, smaller sphere 21 and larger sphere 19 thus establish geometric constraints on 2D images 15 and 17 that permit one to reconstruct 3D scene 10 given only 2D images 15 and 17, as long as the epipolar constraints (i.e. stereo constraints) are known.

Figure 3:
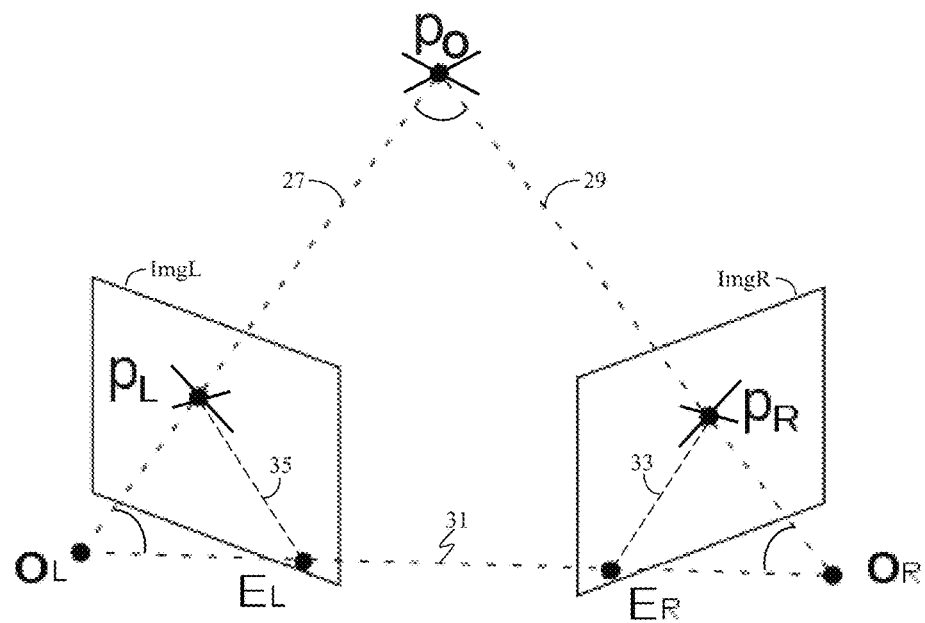
FIG. 3 is an example of defining stereo constraints using Epipolar geometry.

Epipolar geometry is based on the well-known pinhole camera model, a simplified representation of which is shown in FIG. 3. In the pinhole camera model, cameras are represented by a point, such as left point $O_L$ and right point $O_R$, at each respective camera's focal point. Point $P_O$ represents the point of interest (i.e. an object) in the 3D scene being imaged, which in the present example is represented by two crisscrossed lines.

Typically, the image plane (i.e. the plane on which a 2D representation of the imaged 3D scene is captured) is behind a camera's focal point and is inverted. For ease of explanation, and to avoid the complications of a an inverted captured image, two virtual image planes, ImgL and ImgR, are shown in front of their respective focal points, $O_L$ and $O_R$, to illustrate non-inverted representations of captured images. One may think of these virtual image planes as windows through which the 3D scene is being viewed. Point $P_L$ is the 2D projection of point $P_O$ onto left virtual image ImgL, and point $P_R$ is the 2D projection of point $P_O$ onto right virtual image ImgR. This conversion from 3D to 2D may be termed a perspective projection, or image projection, and is described by the pinhole camera model, as it is known in the art. It is common to model this projection operation by rays that emanate from a camera and pass through its focal point. Each modeled emanating ray would correspond to a single point in the captured image. In the present example, these emanating rays are indicated by dotted lines 27 and 29.

Epipolar geometry also defines the constraints relating the positions of each camera relative to each other. This may be done by means of the relative positions of focal points $O_L$ and $O_R$. The focal point of a first camera would project onto a distinct point on the image plane of a second camera, and vise-versa. In the present example, focal point $O_R$ projects onto image point $E_L$ on virtual image plane ImgL, and focal point $O_L$ projects onto image point $E_R$ on virtual image plane ImgR. Image points $E_L$ and $E_R$ are termed epipoles, or epipole points. The epipoles and the focal points they project from lie on a single line, i.e. line 31.

Line 27, from focal $O_L$ to point $P_O$, is seen as a single point $P_L$ in virtual image plane ImgL, because point $P_O$ is directly in front of focal point $O_L$. This is similar to how in image 15 of FIG. 2, smaller sphere 21 appears to be in front of larger sphere 19. However, from focal point $O_R$, the same line 27 from $O_L$ to point $P_O$ is seen a displacement line 33 from image point $E_R$ to point $P_R$. This is similar to how in image 17 of FIG. 2, smaller sphere 21 appears to be displaced to a side of larger sphere 19. This displacement line 33 may be termed an epipolar line. Conversely from focal point $O_R$, line 29 is seen as a single point $P_R$ in virtual image plane ImgR, but from focal point $O_L$, line 29 is seen as displacement line, or epipolar line, 35 on virtual image plane ImgL.

Epipolar geometry thus forms the basis for triangulation. For example, assuming that the relative translation and rotation of cameras $O_R$ and $O_L$ are known, if projection point $P_L$ on left virtual image plane ImgL is known, then the epipolar line 33 on the right virtual image plane ImgR is known by epipolar geometry. Furthermore, point $P_O$ must project onto the right virtual image plane ImgR at a point $P_R$ that lies on this specific epipolar line, 33. Essentially, for each point observed in one image plane, the same point must be observed in another image plane on a known epipolar line. This provides an epipolar constraint that corresponding image points on different image planes must satisfy.

Another epipolar constraint may be defined as follows. If projection points $P_L$ and $P_R$ are known, their corresponding projection lines 27 and 29 are also known. Furthermore, if projection points $P_L$ and $P_R$ correspond to the same 3D point $P_O$, then their projection lines 27 and 29 must intersect precisely at 3D point $P_O$. This means that the three dimensional position of 3D point $P_O$ can be calculated from the 2D coordinates of the two projection points $P_L$ and $P_R$. This process is called triangulation.

Figure 4:
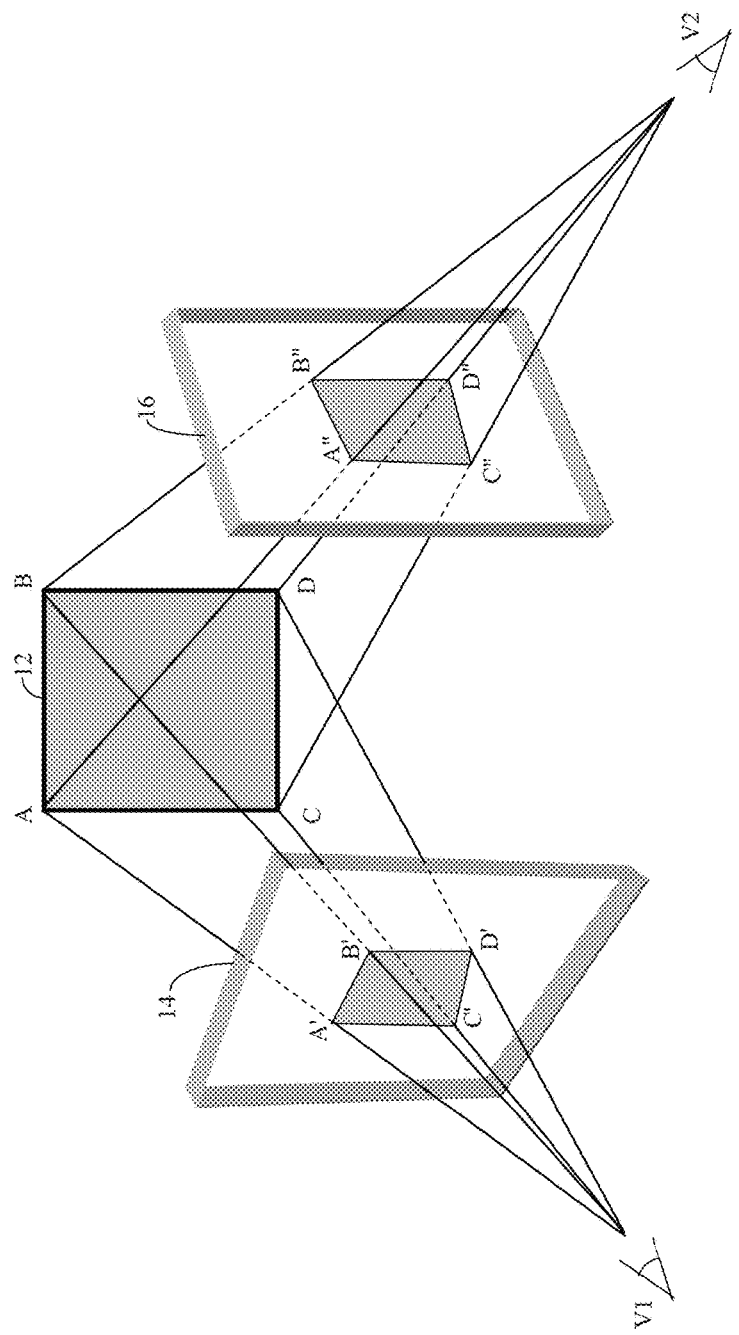
FIG. 4 illustrates the establishment of homography constraints from stereo constraints.

Epipolar geometry also forms the basis for homography, i.e. projective transformation. Homography describes what happens to the perceived positions of observed objects when the point of view of the observer changes. An example of this is illustrated in FIG. 4, where the shape of a square 12 is shown distorted in two image projections 14 and 16 as viewed from two different points of view V1 and V2, respectively. Like before, image planes 14 and 16 may be thought of as windows through which the square 12 is viewed.

Homography would identify the points in common between image projections 14 and 16 and square 12 (i.e. point registration). For example, the four corners A, B, C and D of square 12 correspond respectively to points A', B', C' and D' in image projection 14, and correspond respectively to points A", B", C" and D" in image projection 16. Thus, points A', B', C' and D' in image projection 14 correspond respectively to points A", B", C" and D" in image projection 16.

Assuming that the pinhole model applies, epipolar geometry permits homography to relate any two images of the same planar surface in space, which permits image rectification, image registration, or computation of camera motion (rotation and translation) between two images. Once camera rotation and translation have been extracted from an estimated homography matrix, this information may be used for navigation, or to insert models of 3D objects into an image or video, so that they are rendered with the correct perspective and appear to have been part of the original scene.

Figure 5:
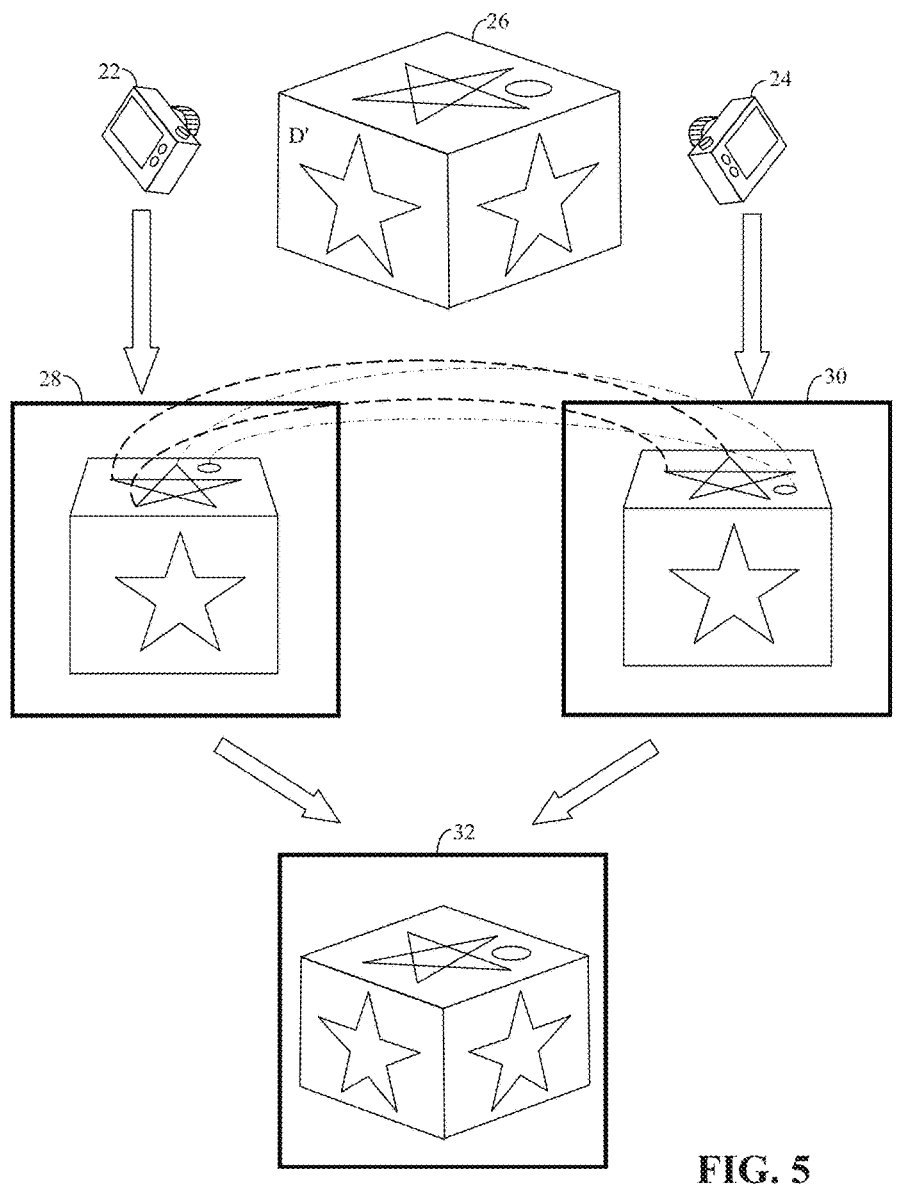
FIG. 5 illustrates homography to re-establish a perspective (i.e. 3D) view from a stereo pair of images, which are images of a common scene but each image has a different field-of-view, i.e. FOV.

For example in FIG. 5, cameras 22 and 24 each take a picture of a 3D scene of a cube 26 from different points of view. From the view point of camera 22, cube 26 looks as shown in 2D image 28, and from the view point of camera 24, cube 26 looks as shown in 2D image 30. Homography permits one to identify correlating points, some of which are shown by dotted lines for illustration purposes. This permits both 2D images 28 and 30 to be stitched together to create a 3D image, as shown in image 32. Thus, automatically finding correspondence between pairs of images is a classic problem in the field of stereo vision. Integral to this, however, is the identifying of feature points in the pairs of images, and the matching of corresponding feature points in the pairs of images.

The above discussion of stereo vision, such as epipolar geometry and homography, may be collectively referred to as perspective constraints, particularly as applied to a stereo image pair.

Because of their use in establishing perspective (i.e. 3D) information, feature based correspondence matching algorithms have found wide application in computer vision. Examples of feature based correspondence matching algorithms are the Gradient Location and Orientation Histogram (GLOH), Speeded Up Robust Features (SURF), scale-invariant feature transform, SIFT, and the Affine SIFT (or ASIFT). Each feature extraction algorithm has its benefits and drawbacks. For example, SIFT and Affine SIFT purposely exclude edge points from their analysis and thus are not well suited for edge detection. For illustration purposes, a SIFT-based algorithm is herein discussed.

As it is known in the art, the SIFT algorithm scans an image and identifies points of interest, or feature points, which may be individual pixels and describes them sufficiently (typically relative to its neighboring pixels within a surrounding window) so that the same feature point (or pixel) may be individually identified in another image. A discussion of the SIFT transform is provided in U.S. Pat. No. 6,711,293 to Lowe, which is herein incorporated in its entirety by reference. Essentially, SIFT uses a library of training images to identify feature points that are characteristic of a specific object. Once a library of the object's characteristic feature points (e.g. pixels) have been identified, the feature points can be used to determine if an instance of the object is found in a newly received test image.

Principally, feature points (i.e. points of interest) of the object are extracted to provide a "feature description" of a specific object. This description, extracted from training images, can then be used to identify the specific object in a test image containing many object-types. To perform reliable recognition, it is preferred that the features extracted from the training images be detectable under changes in image scale, noise, illumination, and rotation. Feature points usually lie near high-contrast regions of an image. However, since distortion of an object (such as if a feature points is located in an articulated or flexible parts of the object) may alter a feature point's description relative to its neighboring pixels, changes to an object's internal geometry may introduce errors. To compensate for these errors, SIFT typically detects and uses a large number of feature points so that the effects of errors contributed by these local variations may be reduced.

In a typical SIFT application, feature points of objects are first extracted from a set of training images and stored in a database. An object is recognized in a new image (i.e. a test image) by individually comparing each feature point extracted from the new image with the feature points in this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object is computed, given the accuracy of fit and number of probable false matches. Object matches that pass all these tests can be identified as correct.

Figure 6:
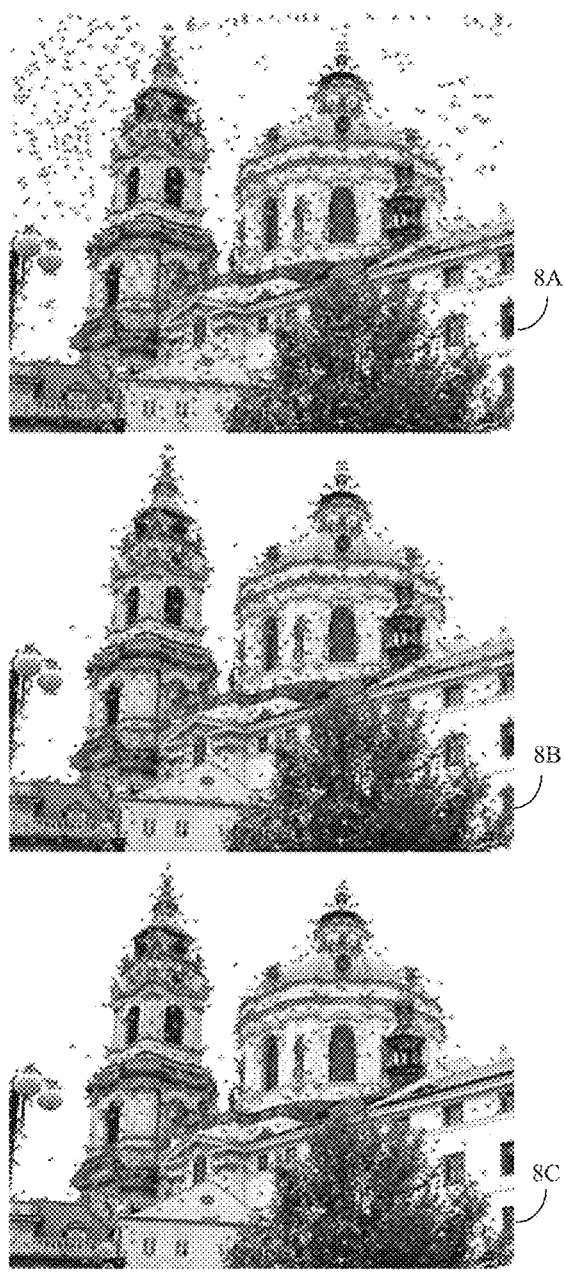
FIG. 6 illustrates feature point extraction from a sample image.

An example of a SIFT determination of feature points in an image is illustrated in FIG. 6. Possible feature points are first identified, as indicated by dark dots in image 8A. Possible feature points that have a low contrast are then discarded, as illustrate in image 8B. Finally, possible feature points located on edges are removed, which leaves the final set of feature points shown in image 8C.

Figure 7:
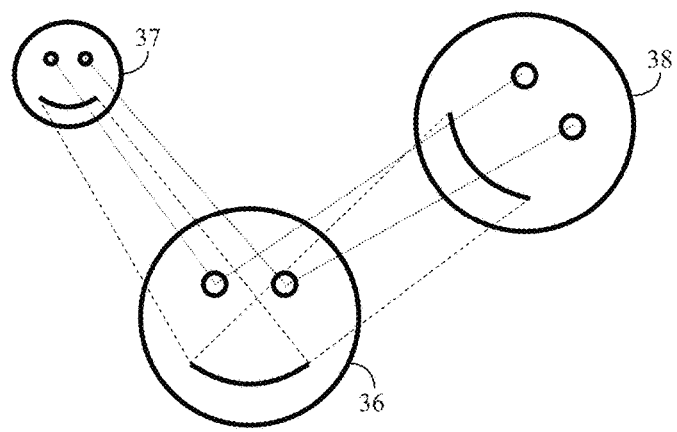
FIG. 7 illustrates the establishment of feature point correspondence using an SIFT transform.

Thus, SIFT permits one to match feature points of an identified object from one image to another. This is illustrated in FIG. 7, where three images of the same object, i.e. a happy face, are shown. For illustration purposes, only four feature points, corresponding to points near the eyes and the corners of the mouth, are shown. As indicated in FIG. 7, SIFT can match feature points from a first face 36 to a second face 37 irrespective of a change in scale. SIFT can also match feature points from first face 36 to a third face 38 irrespective of rotation. However, SIFT has been found to have limited immunity to affine transforms of images. That is, SIFT is limited to the amount of change in the view-angle an imaged object can undergo and still be identified.

A method of extending a SIFT transform to better handle affine transformations is described in "ASIFT: A New Framework for Fully Affine Invariant Image Comparison" by Morel et al, SIAM Journal on Imaging Sciences, vol. 2, issue 2, 2009, which is herein incorporated in its entirety by reference.

Figure 8:
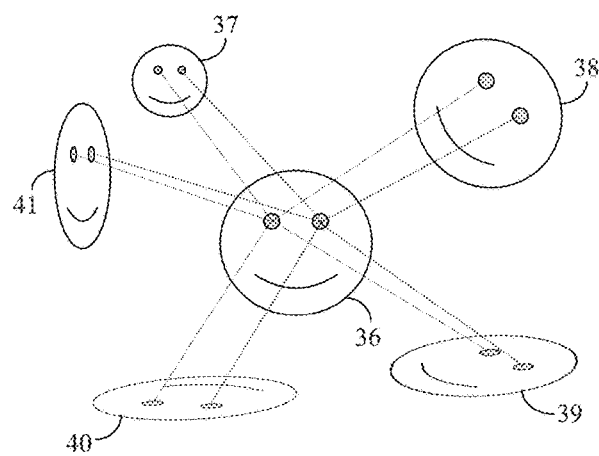
FIG. 8 illustrates the establishment of feature point correspondence using an ASIFT transform.

With reference to FIG. 8, an Affine SIFT would be better able to match feature points from first face 36, to representations of the same object that have undergone affine transformations, as illustrated by happy faces 39, 40, and 41.

An example of an application of an Affine SIFT transform is illustrated in FIG. 9, where multiple feature points are matched from a first image 9A of the Stature of Liberty from a first view angle, to a second image 9B of the Statue of Liberty from a different view angle and at a different scale.

A quick overview of the feature point extraction function of a SIFT filter/algorithm/module/processor is illustrated in FIGS. 10 and 11. With reference to FIG. 10, each extracted feature point ID_1 (such as those illustrated in FIG. 5-8) is described by a series of metrics falling into several categories, i.e. distinguishing characteristics, within a window, e.g. an array of pixels represented as Window_1. The center point (or center pixel) within a window may be identified as the feature point for that window. If desired, each feature point is assigned an identification code, ID, for quick reference. For example feature point ID1_1 may identify the feature point as being feature point number "1" extracted from image "ID1".

The observed metrics are arranged into corresponding histograms, and thus multiple histograms are created for each feature window. Consequently, a typical SIFT processing algorithm creates a series, or a set, of SIFT histograms 66, and each set of histograms collectively describes an individual feature point (or SIFT descriptor). Each of the SIFT histograms statistically describes a distinguishing characteristic of the feature point relative to its neighborhood of pixels (or pixel window) surrounding the feature point (or item descriptor) in the image being processed.

The series of SIFT histograms 66 are then collected (or otherwise combined) into single vector 68, which defines one feature point. That is, each vector 68 provides sufficient data to identify an individual pixel (or feature point) within an image. Therefore, each vector 68 describes a single item descriptor (i.e. a feature point or characteristic feature or (feature) pixel) and typically consists of 128 pieces of descriptive data. Thus, each feature point is characterized (i.e., described or identified) by a 128-dimension vector 68.

FIG. 11 illustrates multiple sets of feature points extracted from n images, where the images are identified as ID1 through IDn. Each image is shown to have a set of feature points (illustrated as circles) individually identified. For example, i feature points are extracted from image ID1, and they are labeled ID1_1 through ID1_i. Similarly, p feature points are extracted from image IDn, and they are labeled IDn_1 through IDn_p. Each feature point is a 128-dimension vector (i.e. a vector with 128 data cells). The extracted feature points from one image may then be matched to (i.e. compared to find a match with) extracted feature points from other images.

The above-described feature points may be used to identify corresponding points in a stereo image pair, but much of the above processing may be minimized or eliminated by proper calibration of the cameras in a stereo image capture system.

Figure 12:
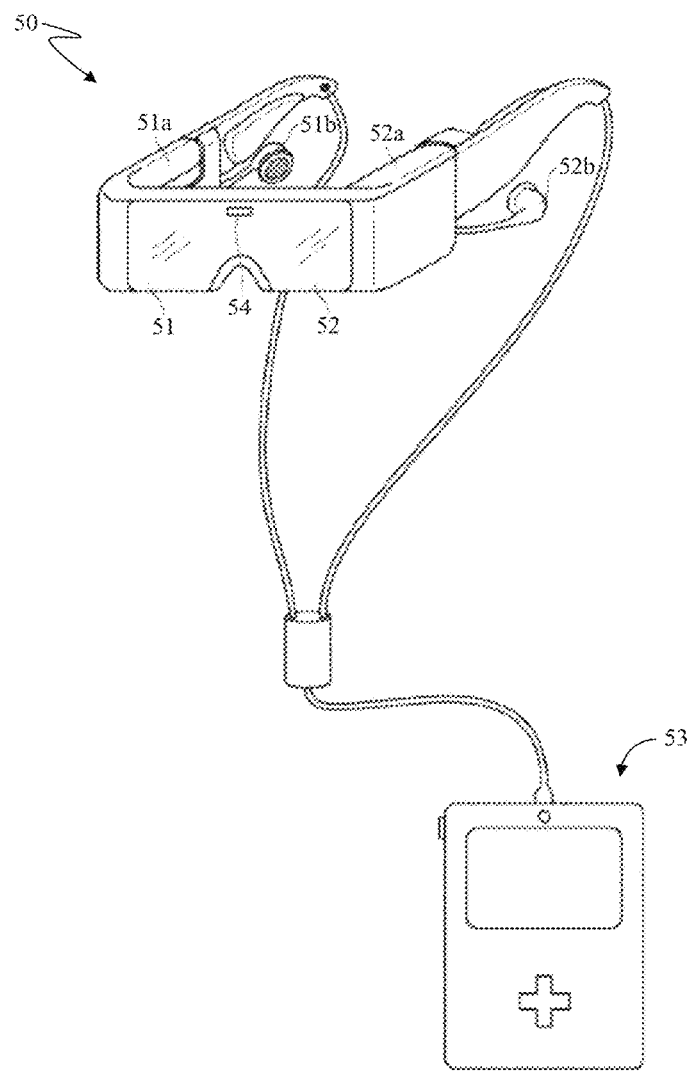
FIG. 12 illustrates an exemplary head-mounted display.

As is explained above, the present invention is directed to a head mounted display (HMD). For illustration purposes, an exemplary HMD 50 is illustrated in FIG. 12. In the present example, HMD 50 is shown having a shape similar to eye glasses and may be worn in a manner similar to eye glasses. All computing resources may be incorporated into HMD 50, or alternatively may be divided between HMD 50 and an auxiliary control unit 53, or some other remote computing resource, e.g. a personal computer, server, etc. If desired, auxiliary control unit 53 may provide a user interface to control HMD 50. Alternatively, all user interface controls may be incorporated into HMD 50.

Preferably, HMD 50 includes a right optical see-through display unit 51 and a left optical see-through display unit 52 that work together to provide left and right images of a stereo image pair that displays a virtual 3D object. In the present case, a user would see both the displayed left and right images of the 3D virtual object and also see an outside scene through the left and right display units, 51 and 52. That is, left and right display units 51 and 52 can be made transparent in areas where the virtual object is not being actively displayed. If desired, a displayed virtual object can also be given a desired level of transparency so that a user may optionally see through a displayed virtual object. Left and right optical see-through display units 51 and 52 may provide an image by means of image projection, transparent OLED or LCD displays, or any other type of transparent displaying means known in the art.

In the present example, HMD 50 includes right earphone 51b and left earphone 52b to provide audio information to a user. Preferably right optical see-through display unit 51 is controlled by an integrated right display driving unit 51a, and left optical see-through display unit 52 is controlled by an integrated left display driving unit 52a.

In the present example, HMD 50 has one integrated camera 54 with known position and pose relative to the left and right optical see-through display units 51 and 52, and relative to predefined world coordinates. It is to be understood, however, that HMD 50 may optionally include two cameras to capture stereo imaging pairs, and thereby obtain 3D information of its surrounding real scene. Alternatively, HMD 50 may incorporate any other known 3D imaging system (i.e. 3D information capturing device) for capturing 3D information of the surrounding scene, such as a 3D laser scanner, a MICROSOFT CORP. KINECT sensor, a range camera, or any of many different types of time-of-flight devices. Further alternatively, one or more 3D information capturing devices may be distributed throughout the surrounding scene and their captured 3D information transmitted, or otherwise conveyed, to HMD 50 and/or auxiliary control unit 53.

A fuller description of an exemplary HMD is provided in U.S. Pub. No. 2013/0234914 assigned to the same assignee as the present application, and herein incorporated in its entirety by reference.

Returning now to the presently preferred use of left and right views to create stereo images in an eye-HMD system, a first step is to calibrate the left and right views the HMD system provides to a user. A method for stereo calibration of the left and right views of a virtual optical see-through (OST) head-mounted display (HMD) consists of modeling left and right calibration matrices that define 3D-2D point correspondences between the 3D coordinates of a reference object in a world coordinate system (i.e. a global coordinate system to which all local coordinate systems may be referenced), and the 2D position of a virtual object in the left and right OST HMD projected images. Preferably intrinsic and extrinsic parameters are considered separately, and one may have separate calibration matrices for the intrinsic and extrinsic parameters.

The 3D pose of the virtual object that results from displaying the left and right 2D images of the 3D virtual object (i.e. stereoscopic projection) is assumed known in the world coordinate system (for example, by 3D anchoring to a 3D real reference object). The 3D pose of the (real) reference object in the coordinate system of the head-tracking device is likewise assumed known. It may be estimated through processing the data recorded by the tracking device. The geometric information including the pose (e.g., translation and rotation) of the tracking device with respect to the left and right eye of an average head model (i.e. the head of an average human user) is directly incorporated into the extrinsic calibration matrix for each eye. The intrinsic parameters are defined by taking into account the information on the position of the average head model's eyes with respect to the two HMD displays, the distance of the virtual image planes from the two eyes, the size and resolution of the projected images (the image skew is assumed negligible). This way, the default calibration matrices for the left and right eye are delivered.

In a customization process, an individual user is offered the opportunity to adjust the calibration parameters to a desired accuracy. For applications of standard levels of accuracy, the customization process consists of adjusting the interpupillary distance of the user, the (preferably observed) object size, and the virtual object position (translation and/or rotation) in the marker coordinate system. After calibrating the focal length, the calibration of the interpupillary distance can be directly related to the virtual object depth calibration and can thus be performed implicitly as a part of the virtual object position calibration. The results of the customization process are used to update the relevant intrinsic and extrinsic default calibration matrices. These matrices are consequently used to anchor the 3D virtual object to the 3D real, reference object. The calibration procedure is fast, simple, and user-friendly.

The presently preferred embodiment is an OST HMD equipped with a mounted camera for visual head-tracking. However, the present calibration method is fully applicable to cases of any other tracking sensors with known pose in the pre-specified world coordinate system. Nonetheless, the complexity of the calibration method may vary depending on the particularities of the augmented reality system in use. Furthermore, the presently preferred embodiment uses a stereo OST HMD calibration, however, it is to be understood that the present invention may be readily modified to monoscopic and 2D-view OST HMD calibrations, which would reduce the calibration procedure.

In essence, the present invention deals with stereo calibration of an optical system comprised of a human user's eyes and optical see-through (OST) head mounted (HMD) displays. The calibration results are used for the purposes of anchoring virtual 3D objects to real environments (i.e. real scenes) and perceptually fusing their views, within a framework of an augmented reality (AR) system.

Calibration is based on specifying intrinsic and extrinsic parameters of a compound eye-OST HMD system (referred to as "virtual camera" in the following discussion) for both left and right virtual cameras related to an average head model, and further based on adjusting parameters for an individual user.

In the preferred embodiment, the OST HMD is equipped with a mounted camera for visual head-tracking. However, the preferred calibration method is fully applicable to any other tracking sensor(s) with known pose in a pre-specified world coordinate system. Nonetheless, the complexity of the calibration method may vary depending on the particularities of the augmented reality system in use.

Figure 13:
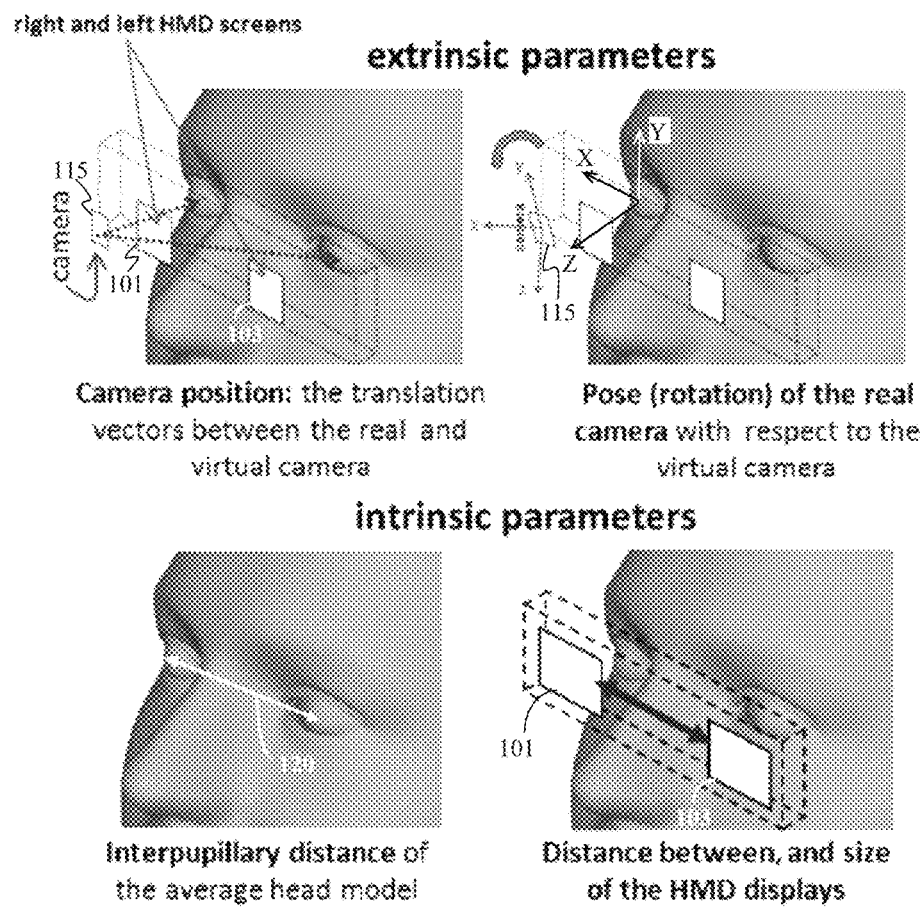
FIG. 13 illustrates some extrinsic parameters and intrinsic parameters of an HMD in accord with a preferred embodiment of the present invention.
Figure 14:
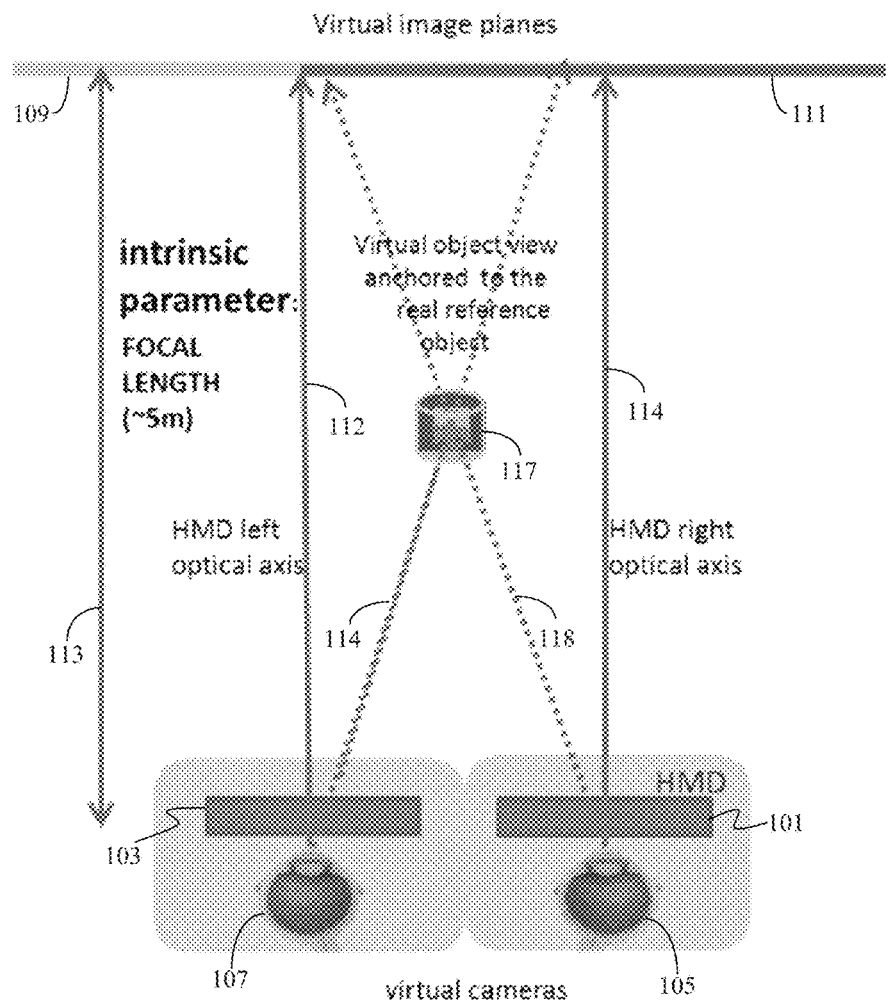
FIG. 14 illustrates some geometric features of a virtual camera.
Figure 15:
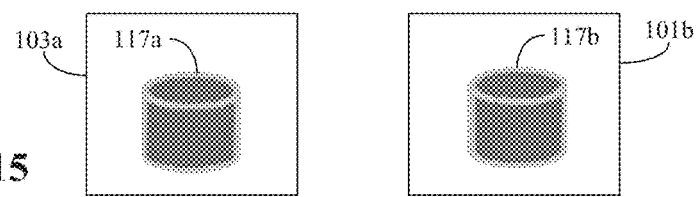
FIG. 15 illustrates a virtual object as viewed through HMD displays.

Calibration uses the available information on the HMD geometry, the relative position of the tracking sensor with respect to the left and right HMD display, the position of the eyes of an average head model with respect to the HMD screens, the distance of the image planes from the respective focal points of the (left and right) virtual camera, and the size and resolution of the projected image, as depicted in FIGS. 13 through 15, for example.

FIG. 13 illustrates some extrinsic parameters and intrinsic parameters of an HMD in accord with a preferred embodiment of the present invention. Regarding the extrinsic parameters, right and left HMD screens 101 and 103 are located at known positions. As is explained above, at least one real camera is mounted on the HMD, and the real camera is related to a virtual camera that depicts a virtual object as viewed by a user's eyes.

With reference to FIG. 14, this means that the virtual cameras would ideally be placed at the location of the user's eyes 105 and 107. In FIG. 14, HMD screens 101 and 103 are shown directly in front of the user's eyes 105 and 107. For the present discussion, eyes 105 and 107 may be thought of as representing virtual cameras since these cameras would ideally "see" the virtual objects that a user should see. Thus, FIG. 14 also shows two overlapping virtual image planes 109 and 111. Also shown is the HMD left optical axis 112 and the HMD right optical axis 114 of the left and right virtual cameras (as represented by left and right eyes 107 and 105), respectively. The focal length 113 from a virtual camera to its corresponding virtual image plane is shown as an intrinsic parameter of a camera, but as is explained below, a user may adjust this focal length and thereby adjust the position of each virtual image plane 109 and 111.

FIG. 15 illustrates left and right images 103a and 101a, as seen for example, through left and right HMD screens 103 and 101. These two images would comprise a stereo image pair, as is explained above. Ideally, left and right images 103a and 101a are of a virtual object (117a and 117b, respectively) that is anchored to a corresponding real physical object 117 by having the virtual object be superimposed on the real object, as is illustrated in the middle of FIG. 14.

With reference to FIG. 14, the superposition of a projected virtual object 117a/117b on a real object 117 is represented by having optical axes lines 114 and 118 intersect (i.e. converge) at the center of real object 117. By having a user adjust the perceived images of the virtual cameras (i.e. virtual objects 117a and 117b) onto the real object 117, the HMD system can determined a distance to the real object 117 and other parameters, as is explained more fully below.

Returning to FIG. 13, square 115 illustrates the use of translation vector to translate the position and pose information of the HMD's real camera to a virtual camera. Also shown in FIG. 13 is the interpupillary distance 120 between a user's pupils. As is explained above, the HMD assumes an initial interpupillary distance based on a model head, but an individual user may optionally adjust this initial interpupillary distance and thereby adjust the intrinsic parameters of the HMD. Another shown intrinsic parameter is the distance between the right and left screens 103 and 101, as well as the screen size and resolution.

The customization process may be rendered to have adjustable accuracy, and is user friendly. User interaction is minimized and preferably reduced to adjusting only five (out of overall twelve) parameters; two intrinsic parameters and three extrinsic parameters. The two intrinsic parameters are the focal length and interpupillary distance (IPD). The three extrinsic parameters are x translation, y translation, and z translation, where x and y signify directions parallel to the principal directions of the HMD screen (e.g. parallel to the plane of the HMD screens), and z is perpendicular to the HMD screen. Preferably, the change in the principal points (i.e. the intersection of the optical axis and the image plane) of the two virtual cameras is updated internally, proportionally to the change of the in-plane translation parameters of the two virtual cameras, under the assumption of the constancy of absolute image coordinates in the virtual image plane.

For applications of standard target accuracy, the rotation error is assumed small and can be minimized by correcting for the translation error.

The method of stereo-calibration of the virtual cameras consists of defining the default calibration matrices for the left and right virtual cameras using direct geometric characteristics of the system, and customizing those matrices simultaneously to reach the desired accuracy for an individual user. Some parts of the following description refer to a single virtual camera, but it is to be understood that a similar description would apply to each of the two virtual cameras of a stereo imaging system (i.e. of the stereo-calibration).

With reference to FIGS. 13-15, the default calibration matrices for the left/right virtual camera are defined as the following two points:

1. For the intrinsic calibration parameters, the pin-hole virtual camera model is assumed. The focal length is set equal to the distance of the image planes from the respective focal points of the (left and right) virtual camera. The coordinates of the principal image point are set at the intersection of the normal (i.e. perpendicular direction) from the eyes to the image planes, relative to the size and resolution of the projected images. The pixel densities are given as ratios of the resolution of the projected images and the respective image sizes.

2. For the extrinsic calibration parameters, translation and rotation parameters are set to the respective translation vector and a rotation matrix of each virtual camera in the coordinate system of the tracking sensor.

The customization of default calibration matrices includes the following three elements:

1. Entering and tuning the known value of the IPD, or manually adjusting the IPD by gauging a model baseline parameter.

2. Adjusting of the virtual object size by manipulating the focal length parameter monoscopically (e.g. using only one of the two stereo cameras, i.e. using only one eye).

3. Centering of the virtual object along x, y, and z directions in the reference coordinate system, simultaneously for the left eye and right eye. The reference coordinate system is preferably an arbitrary coordinate system with a known relation to the coordinate system of the tracking sensor, and to all other used local coordinate systems, such as the virtual camera coordinate system, the coordinate system of the tracking device, the coordinate system of the reference 3D object, any predefined coordinate system with known transformation to the tracker coordinate system.

The position of the reference (anchoring) object is known through processing the data obtained from the tracking-sensor, in real-time. In the case of visual tracking, the world coordinate system is typically attached to the reference 3D or 2D object (e.g., the marker), and the head pose is tracked relative to the reference object.

The below discussion of the preferred embodiment assumes a stereo OST HMD calibration, however, it is straightforward to modify the method and reduce the calibration procedure to monoscopic and 2D view OST HMD calibrations.

A description of a preferred method of the present invention is now provided with reference to FIGS. 13 to 15. The mathematical model uses available geometric information about the system composed of the OST HMD and the user, and these figures illustrate the relation between the calibration parameters and direct geometric measures (i.e. geometric parameters) of the eyes+OST HMD system. The camera 115 (or more generally, any given tracking sensor) is shown placed on the right side of the HMD, but in a general case it can be in any general position on the HMD frame.

Figure 16:
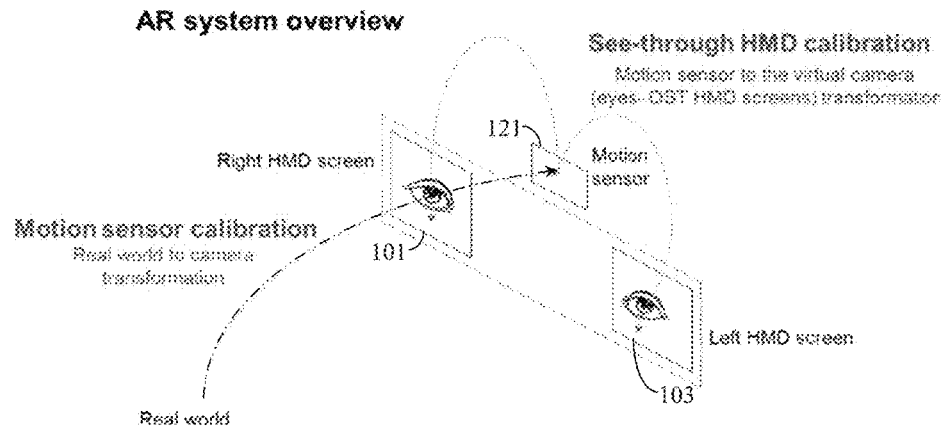
FIG. 16 shows a generalized overview of the AR system.

FIG. 16 shows a generalized overview of the AR system. The goal is to map the world coordinate system to the virtual camera (eyes+OST HMD) coordinate system. Since the latter can be difficult to achieve in practice, the transformation is preferably parsed in two by the help of a head-tracking system (the motion sensor 121). The world coordinates are mapped to the sensor coordinate system, upon which the mapping from the motion sensor 121 to the virtual camera coordinate system is performed.

The presently preferred embodiment uses a calibration method different from most prior art OST HMD calibration methods in an AR context. Instead of collecting the point correspondences, as is typically done, the preferred embodiment employs direct geometric measures of the system that consists of an OST HMD and an HMD user to define default calibration matrices. An individual user then goes through a customization process, which consists of perceptually aligning the virtual and real 3D object by directly manipulating the individual calibration parameters responsible for the formation of the 2D left and right stereo image pair. Nonetheless, user interaction is still minimized by this method.

It is emphasized that this method avoids the use of landmark points, and thus avoids any point-by-point alignments individual landmark points (e.g. avoids point correspondences). In the presently preferred embodiment, user interaction, and thus user error, is minimized because the user does not move physically any points to bring a virtual object and a real reference object into alignment. The user is rather offered a choice of incrementally different poses of the virtual object that result from incremental changes of a reduced number of calibration parameters. Any user error in pointing at correct point positions, as well as any error in tracking the user movements is thus fully circumvented.

The present method further minimizes interactions between the user and the HMD. In the present approach, the user only has to review in differential, incremental steps, a few calibration parameters, individually, that result in different representations of the complete (i.e. whole) virtual object, and choose the best set of parameters.

To further simply the present calibration procedure, the number of user-alterable calibration parameters is reduced by following a number of assumptions listed below. At the same time, parameters that have the capacity to compensate for the effects of other calibration parameters (e.g., translation parameters that can compensate for small rotations, as will be explained further in the text) are retained. The present procedure is further designed to properly order the optimization of different parameters, and thus avoid iterating over different parameters.

The present embodiment further avoids introducing potential numerical errors that may arise as a consequence of solving dynamic/mechanical equations linking a 3D pose differential with a parameter vector differential.

To further simply the present calibration procedure for a user, the present system offers the user a choice of which coordinate system to work in.

In summary, unlike prior art calibration method that relied on data point collection to define default calibration matrices, the present method uses direct geometric information of the system and thus no data collection is needed. Also unlike previous calibration methods that use algebraic or numerical solvers to define default calibration matrices, the present method circumvents this step completely. The present method requires user interaction for the customization step only, and then only requires minimal user interaction to select the best visually satisfying calibration set from among a fixed set of incremental choices, whereas previous calibration methods necessitated extensive user interaction and effort to manipulate individual data points. Also unlike previous methods for calibration refinement, which worked in a fixed coordinate system, the presently preferred embodiment offers a choice to the user on which coordinate system to work in (the default choice is the marker coordinate system, for visual head-tracking).

Figure 17:
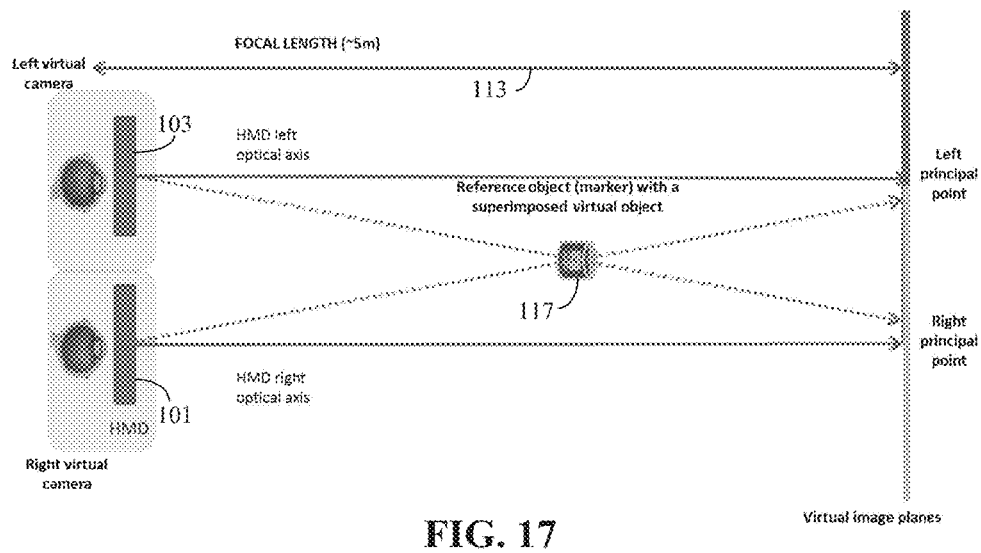
FIG. 17 illustrates a pinhole model of a virtual camera.

The basic calibration procedure of the preferred embodiment assumes 11 points, or features of assumptions, of the system. An objective of the present invention is that the basic calibration procedure satisfy the requirements of standard application accuracy. To simplify the calibration process and minimize the user interaction, while retaining the desired level of accuracy, the following assumptions (i.e. points) are made:

1. The pinhole model of the virtual camera (the left and right OST HMD-eye systems) is assumed (i.e. used), as shown in FIG. 17.

2. The virtual camera principal image point is at the direct perpendicular projection from the user's pupil. Parallel viewing axes are assumed.

3. The focal length of the virtual camera is assumed the same for both left and right eyes.

Figure 18:
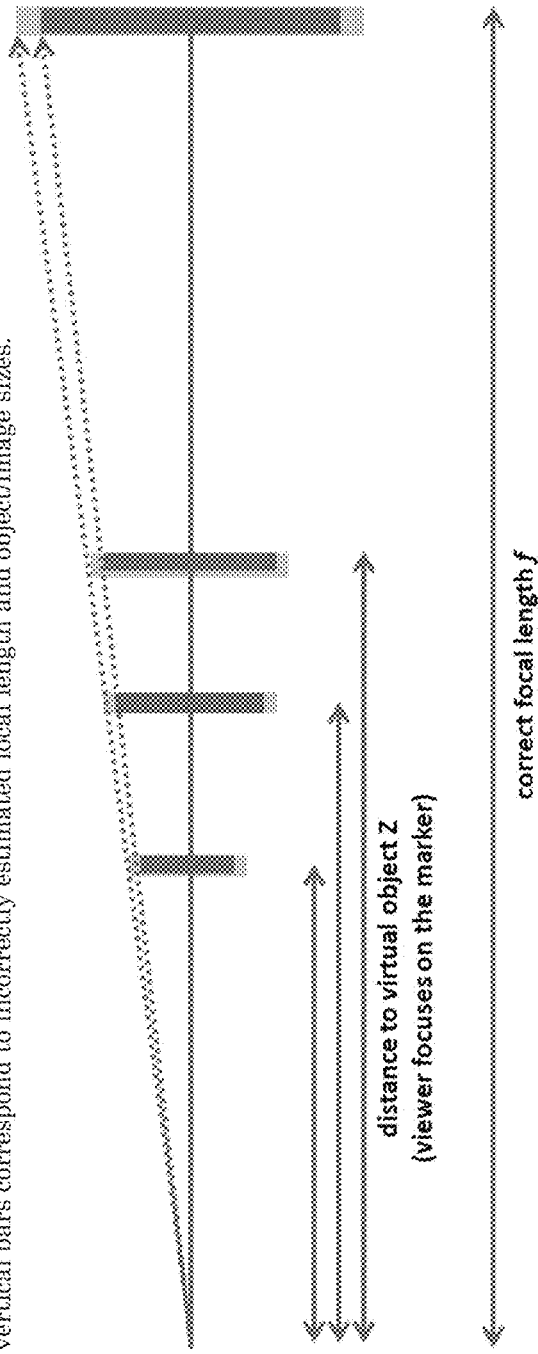
FIG. 18 illustrates focal length adjustment using a projected virtual object.

4. When the focal length is properly adjusted monoscopically (i.e., viewing the scene with only one eye at the time), the object size is correct. That is, when the focal length is not adapted for (e.g. adjusted to) the pin-hole model of the virtual camera, the perceived size of the virtual object in the marker plane (viewed monoscopically) is not correct, as is illustrated in FIG. 18. In FIG. 18, darker vertical bars (i.e. darker color) correspond to correctly estimated focal length and object/image sizes, and lighter vertical bars (i.e. lighter color) correspond to incorrectly estimated focal length and object/image sizes. As illustrated, the virtual distance of the virtual object to the HMD may be obtained from the adjusted focal length.

Figure 19:
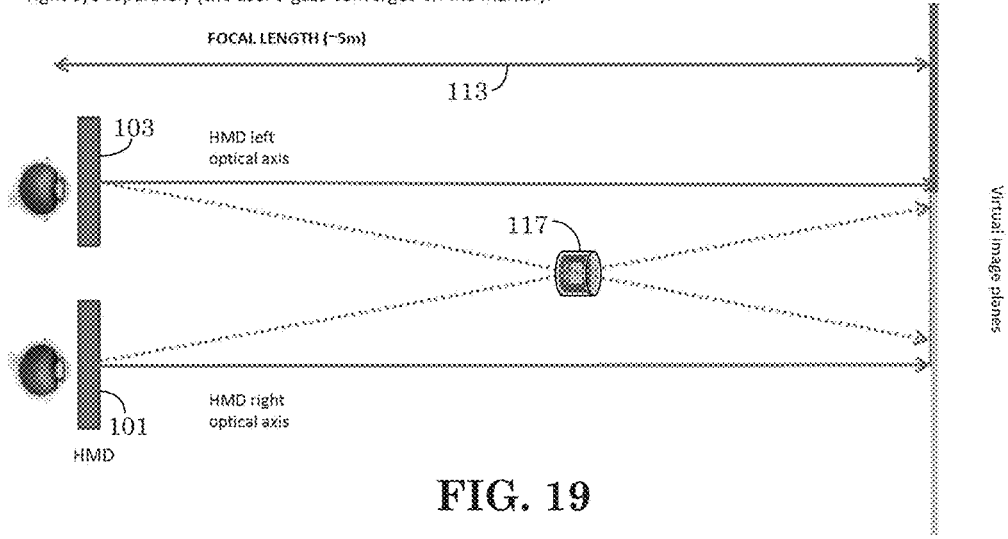
FIG. 19 shows left and right monoscopic views focused on, and coinciding with, each other.
Figure 20:
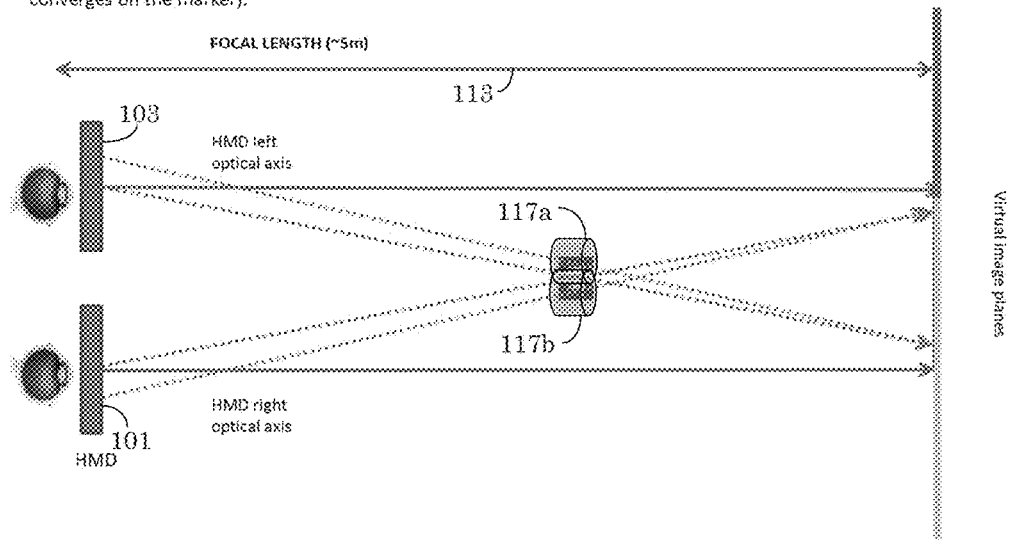
FIG. 20 shows a case where a virtual object perceived by a right eye does not coincide with another virtual object perceived by a left eye due to interpupillary distance (IPD) not being optimal.

5. If the focal length is properly adjusted, the interpupillary distance (IPD) is assumed adjusted when the monoscopic views (i.e. each eye is used separately, one at time) of the virtual object for the left and right eye overlap, when the user focuses on the correct depth. For example, FIG. 19 shows that the left and right monoscopic views are focused on, and coincide, with each other. In the present example, it is assumed that the perceived virtual object coincides with real reference object 117. By contrast, FIG. 20 shows a case where a virtual object 117b perceived by the right eye does not coincide with another virtual object 117a perceived by the left eye, and thus IPD is not correct (assuming that the focal length as already been set correctly), and needs to be further adjusted. In this manner, a user may easily determine his/her correct IPD.

6. The aspect ratio is assumed constant across different users, as it is determined by the HMD optics (16:9).

7. The rotation error is assumed small and can be compensated for by correcting for the translation error, as is illustrated in FIG. 21.

8. Image skew is assumed null.

9. The sensor 121 is fixedly mounted to the HMD frame, such as on goggles as illustrated in FIG. 16.

10. Points 2 and 7 above imply that the only difference between the left and right calibration matrix will be due to the interpupillary distance. Therefore for a centered average head model, it is assumed that the principal image point is the same for the left and right virtual cameras, in their respective virtual image planes.

Figure 22:
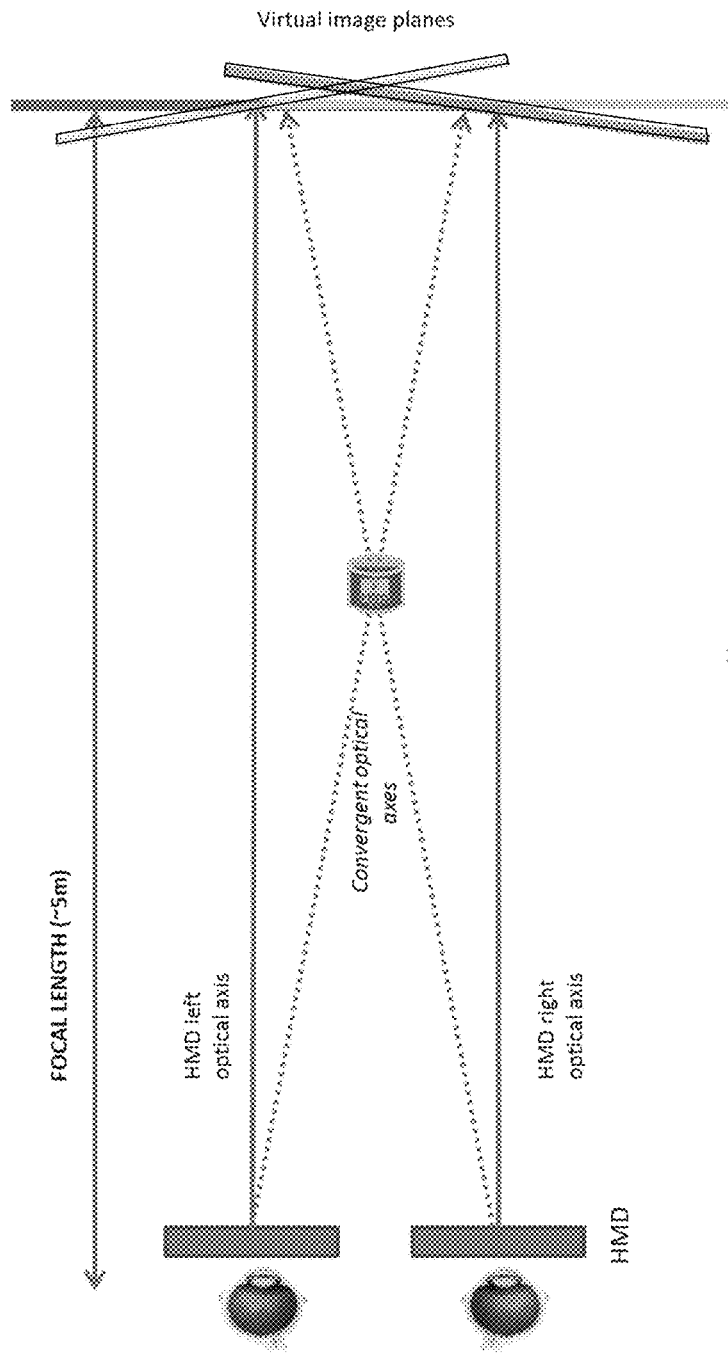
FIG. 22 illustrates calculated disparity due to a given IPD.
Figure 27:
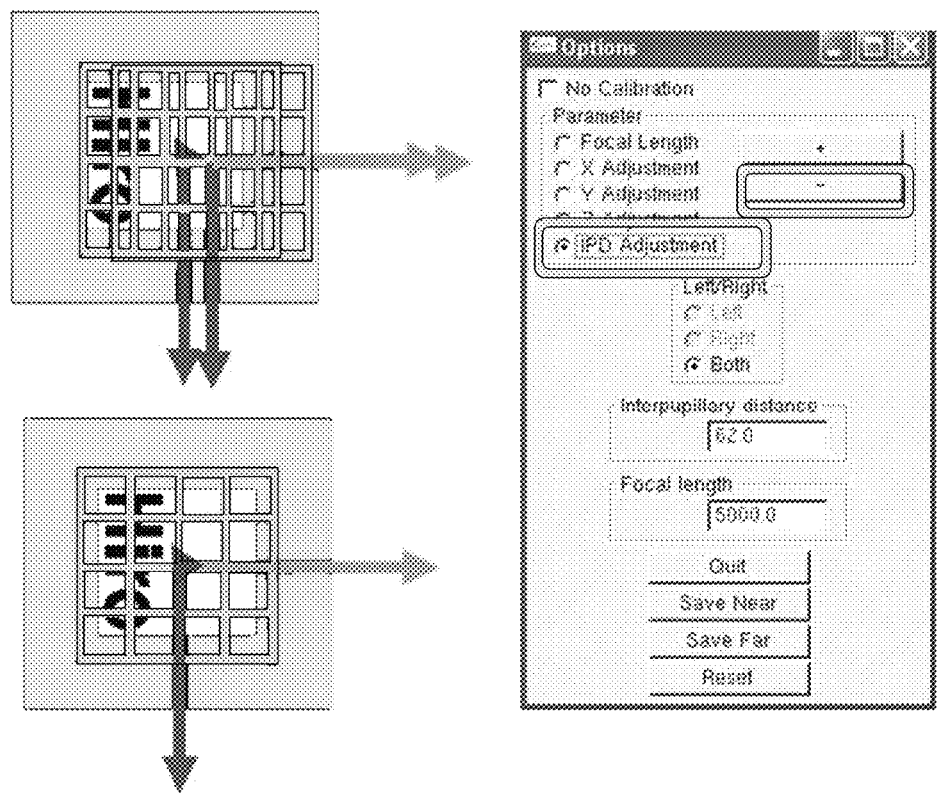
FIGS. 27, 28A, 28B, 29, and 30 graphically illustrate some steps in the calibration procedure.
Figure 28A:
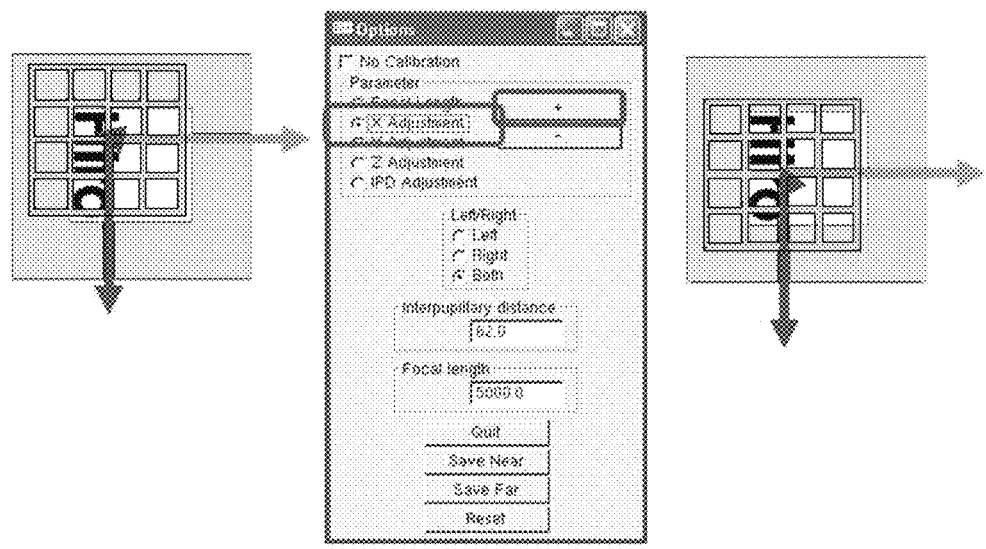
Figure 28B:
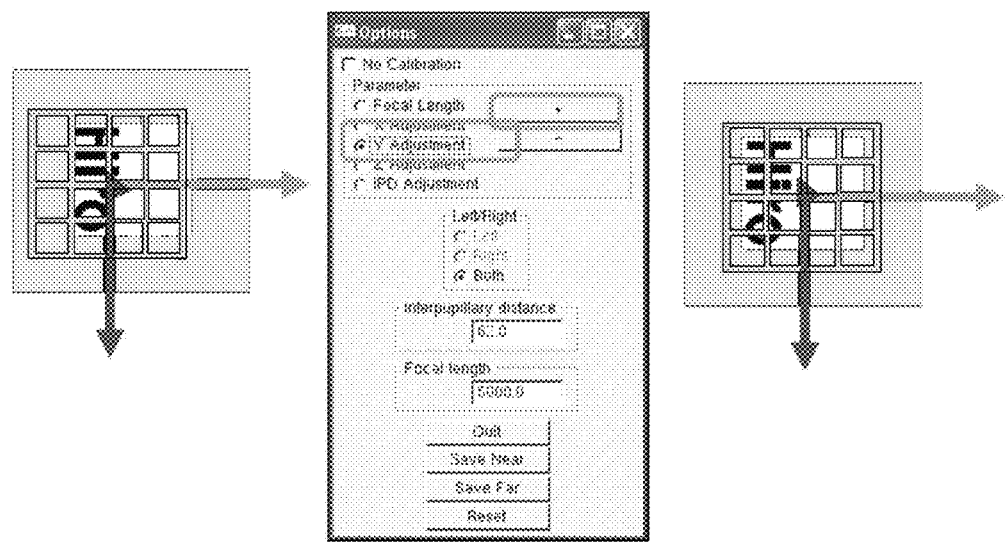
Figure 29:
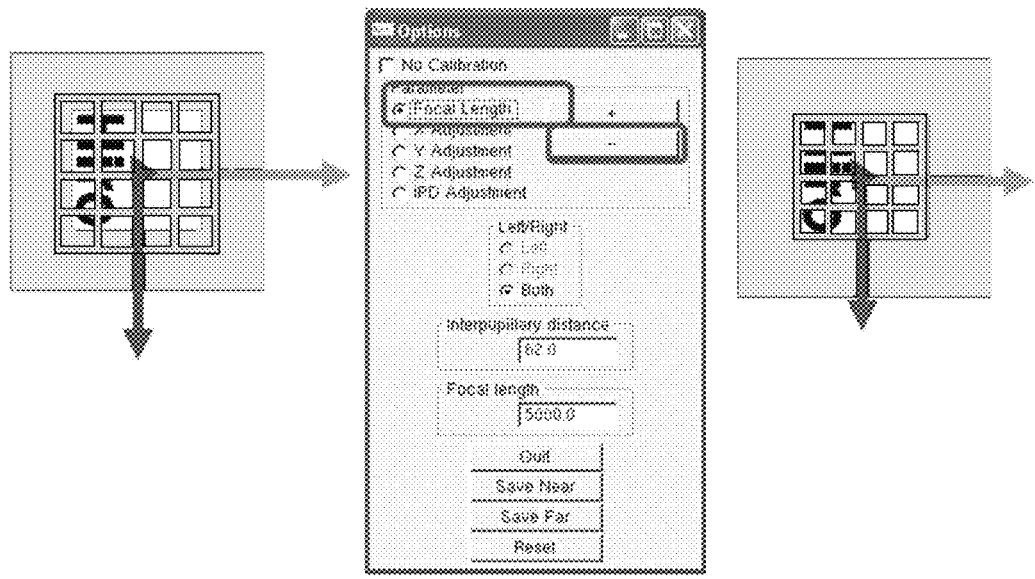
Figure 30:
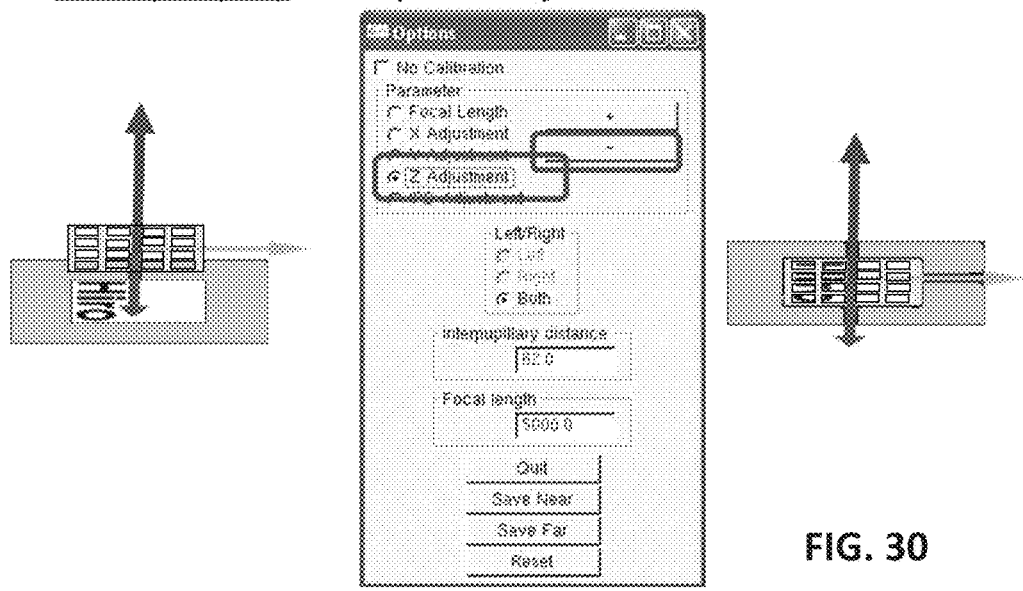

11. As stated in point 2, the pin-hole camera model and the fixed virtual image planes that are placed perpendicularly to the viewing axes, as illustrated in FIG. 17, imply parallel viewing axes for the left and right eye. The calculated disparity is thus strictly due to the given IPD, as is illustrated in FIG. 22.

For higher accuracy applications, the assumptions 3, 6 and 7 can be relaxed, and the user may be offered a richer set of possible parameters to adjust, if the user deems it beneficial. It is noted however, that this option would necessitate more experienced OST HMD users and that the potential benefits would need to be examined first as they might not outweigh the increased invested effort.

Even with a perfect knowledge of the variables that constitute the calibration matrices, the calibration result may not, and in general is not perfect. This is a consequence of the pin-hole virtual camera model assumption, but is also an outcome of some perceptual issues in augmented reality, as is further explained below.

Next, the choice of the coordinate system for calibration customization is discussed. Initially, the calibration matrices are defined in the tracking camera coordinate system. (Recall that although the method is illustrated on an OST HMD system equipped with visual tracking, the method is easily extendable to OST HMD systems that utilize any other type of tracking methods, or a mixture of tracking methods.) This coordinate system is not a natural coordinate system for object manipulations as the human eyes view the world from the perspective of their own coordinate system, as is illustrated in FIG. 23. Hence to facilitate the calibration that relies on perceptually aligning the views of the virtual and real objects, the preferred embodiment transforms the initial coordinate system from the real to the virtual camera coordinate system. The relevant calibration parameters are then incrementally modified in the virtual camera coordinate system.

Even after transforming the view to the virtual camera coordinate system, the user may find it less intuitive than working in a predefined reference coordinate system, such as for example, in the coordinate system of the reference 3D (or 2D) object (e.g., the marker used in the case of visual tracking) to which the user wants to anchor the virtual object view (as is illustrated in FIG. 24). To this end, the preferred embodiment transforms the coordinate axes of the reference, anchoring real object to the virtual camera coordinate system, employing the chain of transformations as explained in FIG. 24, and performs the calibration in the anchoring object coordinate system. Similarly, the present embodiment can work in any, user specified, coordinate system, for which the transformation to the fixed-world coordinate system or the tracker camera coordinate system is known. (The same reasoning applies to OST HMD systems using any given tracking device or a mixture of two or more tracking devices.)

Next the topic of implementing differential motions of the virtual camera is discussed.

To successfully transform the motion in any given coordinate system, the preferred embodiment defines how the infinitesimal motions along x, y and z axes of the eye coordinate system project onto the calibration parameters. Motions in the x-y plane will directly transform into change of translation parameters in the x-y plane of the two virtual cameras coordinate systems (left and right). Motion in depth (along z) maps into the IPD change that is reflected in direct change of the left and right translation parameter along the virtual cameras x-axis.

With reference to FIG. 31, $\Delta T_{x(y)}$ stands for infinitesimal change of the extrinsic translation parameter. $\Delta X(Y)$ is the infinitesimal change of $X(Y)$ coordinate in the eye coordinate system, while $\Delta Z$ denotes the infinitesimal change in depth (in the eye coordinate system). Subscripts x and y denote the axis in question, and subscripts L and R indicate the left and right virtual camera, respectively. Both equations (1) and (2) are derived under the assumption of constancy of absolute point position in the projected virtual image plane.

The change in $\Delta T_{x(y)}$ implies inherently the change of the image principal point $C_{0x(y)}$, as illustrated in equation (3) of FIG. 31, where $S_{x(y)}$ (px/mm) is the pixel density.

Once these infinitesimal motions are defined, any combination of coordinate axes in the virtual camera coordinate system (as illustrated in FIG. 24 and equations (1), (2), and (3), and as the result of infinitesimal transformations along individual coordinate axis in the chosen reference coordinate system) can be properly calculated.

Next, discrepancies between the theoretical and true values for calibration parameters are addressed.

In regards to perceptual issues in augmented reality, in natural vision, the human visual system uses a variety of depth cues to infer depth information. Thus in the real world, accurate depth perception is enabled by a variety of depth cues that exist in accord with each other. Contrary to that, the stereoscopic displays can deliver only a subset of available depth cues. The missing or uncontrolled depth cues can either lack or provide false depth information and result in distorted perceptions. For example, even though the accommodation (i.e. set of adjustments) might be a weak depth cue, it can still significantly alter both depth and size perception. Having the image planes much further than the working distance (preferably at 5 m, while the working distance is typically kept at arm-length) will produce an effect of perceiving the object closer to the image plane, and hence, further from the user. The optimal IPD will then be greater than the true user's IPD. This is a plausible explanation why the optimally calibrated IPD might overshoot the true IPD. Similarly, the accommodation mismatch between the real and virtual objects may confuse the user who may perceive the virtual object at a wrong depth, even if the real object is placed at the same depth as the virtual object view; the accommodation differences between the two objects may result in different depth cues.

Furthermore, it has been shown that the human visual system is not capable of discriminating depth finer than the 7 mm bound regardless of the shape and size of the stimuli.

The aforementioned implies that even for perfectly set default parameters, some small tuning may still be needed to achieve a correct perceived calibration, and that a perfect calibration is inherently difficult to achieve due to the margins of human abilities to discriminate depth.

In terms of ranges for calibration, under the assumption of a perfectly recovered head-position from the tracking mechanism, irrespective of the user distance to the real, reference object, the calibration results may still differ for different distance/depth ranges. Moreover, if the calibration parameters were not perfectly gauged for one depth range, then the error might proportionally increase at depth ranges distal to the calibrated range.

The dependence of the calibration result on the depth range is primarily due to the perceptual issues discussed above. Another reason is the violation of the pinhole model with parallel viewing axes, where potential small differences in the focal length and/or convergence angle may arise in different depth ranges.

Typically, one does not find that calibration results differ for short range (30-40 cm) tests and medium range (70-80 cm) tests if the user reports fully successful calibration for one of the ranges. Yet, because of the aforementioned, the preferred embodiment encourages the users to calibrate the device around the working distance for a particular application. Alternatively, small linear correction terms might be employed to level the calibration for different distance ranges.

Turning now to the topic of calibration protocol, this section assumes that visual tracking of the head pose is used. It is straight-forward to modify the protocol for any other tracking sensor integrated in the AR system. The default calibration matrices are defined using direct geometric measures (i.e. geometric parameters) of the system. With reference to FIGS. 25, 26A and 26B, the calibration customization protocol, in the case of visual tracking, consists of the following eight steps:

1. The user puts the goggles on and positions them right in front and perpendicular to the user's eyes. Correct positioning of the goggles is important for successful calibration and usage of the AR system. The default calibration matrices, defined using direct geometric information of the system, are loaded.

2. The user chooses the coordinate system for calibration. By default, the marker coordinate system is set.

3. If known, the user enters the correct value and fine-tunes the IPD. Otherwise, the user adjusts the IPD, as explained above. The marker is preferably positioned vertically and perpendicularly to the viewing axes.

4. Keeping the marker in the same position, the user centers the object on the marker along the x- and y-directions (binocularly).

5. Having centered the view of the virtual object in a planar fashion on the marker and keeping the marker still in the vertical position, the user adjusts the size of the test object by adjusting the focal length monoscopically. If the IPD is set correctly and if the focal length is adjusted properly, the object depth from the user should be optimally adjusted after performing the steps 3 and 5.

6. Keeping the marker in the same position as for the step 5, if the focal length has been modified, the user might need to re-adjust the perceived virtual object position so that the test object remains centered on the marker. The x and y positions in the virtual camera coordinate system should be optimally adjusted after performing the steps 4 and 6.

7. The user positions the markers more horizontally or laterally and verifies if any further adjustments are necessary to anchor and center the test object (e.g. virtual object) to the marker (e.g. real reference object). The necessary adjustments are done in the coordinate system of choice (the marker coordinate system by default), and the search for the optimal IPD and planar translation is implicit, embedded in the object alignment procedure.

8. The calibration customization process ends.

The calibration procedure is explained step-by-step graphically in FIGS. 27, 28A, 28B, 29, and 30.

Next, sensor calibration is described. The following calibration method assumes a perfect tracking sensor calibration, and perfect recovery of the head pose. The case of the present visual tracking AR system was tested in detail, but the principles are valid for any other tracking mechanism. The camera was calibrated using the OpenCV calibration tool (Open Source Computer Vision Library), known in the art. The calibration pattern used was a checkerboard grid, 14 cols×10 rows, square size=10.8 mm. Testing confirmed the importance of accurate camera calibration (applicable to other sensor types) in head pose recovery.

Using the ARToolkit marker and tracking method (ARToolkit is a known-in-the-art software library for building Augmented Reality applications), tests were likewise run to estimate the marker tracking error in short to medium-far ranges (20 cm-1 m), keeping the small-angle camera axis with respect to the marker surface normal. The tracking error remained on the level of 2-3 mm up to around 90 cm. The performance degraded for distances greater than 90 cm (presumably as a result of smaller pixel density per marker surface unit).

For the sake of completeness, some additional details of the mathematical model used in the preferred embodiment are herein explained.

The relation between a 3D point in world coordinates and its 2D projection in image (pixel) coordinates can be represented in the matrix form depicted by formula (4) in FIG. 32. In this case, the 3D world and 2D points X and p are given in homogeneous coordinates, w is an arbitrary scale, and P is the projection matrix unifying the extrinsic and intrinsic components. That is, P is defined as shown in formula (5), where symbol (6) is the intrinsic parameter matrix, $u_0$ and $v_0$ represent the image pixel coordinates of the image plane center, fu is the focal length times the pixel density in the x-direction. Similarly, fv is the focal length times the pixel density in the y-direction. R stands for rotation matrix and t stands for translation vector. The mathematical model is preferably defined by composing the P-matrix, which is done by inserting direct geometric measures (i.e. geometric parameters) corresponding to an average head model.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A calibration method of an optical see-through (OST) head-mounted display (HMD) of an augmented reality (AR) system including a user interface, comprising:
   (a) tracking a reference object using a camera;
   (b) projecting a virtual object corresponding to the reference object using a calibration matrix set so that the projected virtual object and the reference object are allowed to be perceived through the HMD, the calibration matrix set being predefined based on geometric measures of a head model and an HMD model and having a predefined sub-set of parameters that are adjustable parameters;
   (c) changing at least one adjustable parameter within the calibration matrix set by predefined incremental change amount, which may be positive or negative, input through the user interface, wherein the at least one adjustable parameter is changed by the predefined incremental change amount which define a predefined number of incremental changes of the at least one adjustable parameter;
   (d) projecting the virtual object using the calibration matrix set including the at least one adjustable parameter changed by the amount;
   (e) allowing the steps of (c) and (d) to be performed until the virtual object is allowed to be perceived to be substantially aligned with the reference object, thereby adjusting the calibration matrix set.

2. The method of claim 1, wherein the HMD is part of a stereo AR system providing a binocular image of the projected virtual object.

3. The method of claim 2, wherein:
   the binocular image is comprised of a left image and a right image;
   in step (e), the projected image is allowed to be perceived separately in each of the left image and right image; and
   the virtual object is deemed to have been allowed to be perceived to be substantially aligned with the reference object when the projected virtual object in the left image and the right image are aligned with each other and with the reference object.

4. The method of claim 1, wherein:
   the calibration matrix set includes an extrinsic parameter matrix and an intrinsic parameter matrix, both matrices being defined from direct geometric measures of the OST HMD and head model; and
   the extrinsic parameter matrix and intrinsic parameter matrix are based on a pin-hole camera model.

5. The method of claim 4, wherein changes to adjustable parameters of the extrinsic parameter matrix are determined from geometric measures of a 3D pose (3D rotation+3D translation) of a projected and aligned virtual object by using the known dimensions, location and orientation of the real target object and a coordinate system of the real target object.

6. The method of claim 5, wherein values in the coordinate system of the real target object are converted to values in a coordinate system of the projected virtual object.

7. The method of claim 5, wherein each projected virtual object is generated using a virtual camera model.

8. The method of claim 4, wherein:
   the projected virtual object is based on the pin-hole camera model;
   parameters within the intrinsic parameter matrix are defined using the following geometric measures:
   a distance from a center of the virtual pin-hole camera to a center position of a virtual image plane of the virtual pin-hole camera is used to define a focal length; and
   the center position of the virtual image plane with respect to the head model is based on an image resolution of the projected image and a pixel density of the projected virtual object.

9. The method of claim 8, wherein:
   the OST HMD is a stereo AR system providing a binocular image of the projected virtual object;
   the binocular image is comprised of a left image and a right image, each having a respective extrinsic parameter matrix and an intrinsic parameter matrix; and
   the same defined focal length is used for both left image and right image.

10. The method of claim 8, wherein one of said adjustable parameters is an interpupillary distance (IPD), and an optimal (IPD) is found by:
    in step (e), the virtual object is separately allowed to be perceived to be substantially aligned with the reference object in each of the left image and right image; and
    the virtual object is deemed to have been allowed to be perceived to be substantially aligned with the reference object when the projected virtual object in the left image and the right image aligned with each other and with reference object.

11. The method of claim 10, wherein the optimal IPD does not match a user's true IPD.

12. The method of claim 1, wherein in step (c), the user interface provides a plurality of said instructions, each being individually selectable, and each representing a different and predefined amount of change in the at least one adjustable parameter.

13. The method of claim 1, wherein:
    the HMD has at least one image screen;
    a first time that step (c) is executed, the at least one adjustable parameter changes an interpupillary distance (IPD) of the HMD;
    after the IPD is changed in the first time that step (c) is executed, a distance from the HDM to the reference object is defined by adjusting a focal length of one screen of the HMD in a subsequent execution of step (c) to perceive the projected virtual object to be of substantially equal height as the reference object.

14. A non-transient computer readable media embodying instructions to execute the method of claim 1 by a computing device.

15. The method of claim 1, wherein
    in the step of (d), the user is offered a choice of predetermined, incrementally different poses of the virtual object that result from the one or more incremental changes of the at least one adjustable parameter, and in the step of (e), the steps of (c) and (d) are performed until the user selects one of the predetermined, incrementally different poses.

16. The method of claim 1, wherein:
wherein, in the step (c), the changing of the at least one adjustable parameter includes changing at least one of three extrinsic parameters and two intrinsic parameters.

* * * * *